United States Patent
Fusarpoli et al.

(10) Patent No.: US 10,239,296 B2
(45) Date of Patent: *Mar. 26, 2019

(54) MULTILAYER PVDC BARRIER HEAT SHRINKABLE FILMS

(71) Applicant: CRYOVAC, INC., Duncan, SC (US)

(72) Inventors: Flavio Fusarpoli, Rho (IT); Giuliano Zanaboni, Trecate (IT); Serena Stracuzzi, Parabiago (IT)

(73) Assignee: Cryovac, LLC, Charlotte, NC (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/111,614

(22) PCT Filed: Jan. 15, 2015

(86) PCT No.: PCT/EP2015/050718
§ 371 (c)(1),
(2) Date: Jul. 14, 2016

(87) PCT Pub. No.: WO2015/107127
PCT Pub. Date: Jul. 23, 2015

(65) Prior Publication Data
US 2017/0066228 A1    Mar. 9, 2017

(30) Foreign Application Priority Data
Jan. 15, 2014   (EP) .................... 14151344

(51) Int. Cl.
| B32B 27/08 | (2006.01) |
| --- | --- |
| B32B 27/36 | (2006.01) |
| B32B 27/30 | (2006.01) |
| B32B 27/32 | (2006.01) |
| B32B 27/34 | (2006.01) |

(52) U.S. Cl.
CPC .............. *B32B 27/36* (2013.01); *B32B 27/08* (2013.01); *B32B 27/304* (2013.01); *B32B 27/306* (2013.01); *B32B 27/32* (2013.01); *B32B 27/34* (2013.01); *B32B 2250/24* (2013.01); *B32B 2270/00* (2013.01); *B32B 2307/31* (2013.01); *B32B 2307/518* (2013.01); *B32B 2307/54* (2013.01); *B32B 2307/546* (2013.01); *B32B 2307/7242* (2013.01); *B32B 2307/7244* (2013.01); *B32B 2307/736* (2013.01); *B32B 2439/70* (2013.01)

(58) Field of Classification Search
CPC ..... B32B 27/08; B32B 27/304; B32B 27/306; B32B 27/32; B32B 27/34; B32B 2250/24; B32B 2270/00; B32B 2307/31; B32B 2307/518; B32B 2307/54; B32B 2307/546; B32B 2307/7242; B32B 2307/7244; B32B 2307/736; B32B 2439/70

See application file for complete search history.

(56) References Cited

U.S. PATENT DOCUMENTS

| 3,456,044 | A | 7/1969 | Pahlke | |
| --- | --- | --- | --- | --- |
| 4,064,296 | A | 12/1977 | Bornstein | |
| 5,079,051 | A | 1/1992 | Leigh | |
| 5,089,308 | A | 2/1992 | Nordness | |
| 5,182,307 | A | 1/1993 | Kumar | |
| 6,699,549 | B1 * | 3/2004 | Ueyama et al. | .... B29C 47/0026 428/36.7 |
| 6,764,729 | B2 | 7/2004 | Ramesh | |
| 8,039,070 | B1 | 10/2011 | Sawall | |
| 2004/0065052 | A1 | 4/2004 | Ramesh | |
| 2006/0172096 | A1 * | 8/2006 | Kyle et al. | ................ B32B 1/02 428/35.2 |
| 2006/0177612 | A1 * | 8/2006 | Peterka | .................... B32B 7/02 428/34.9 |
| 2011/0236540 | A1 * | 9/2011 | Owensby et al. | ...... B32B 27/34 426/106 |
| 2014/0017490 | A1 * | 1/2014 | Forloni | ................... B32B 27/08 428/354 |
| 2017/0198123 | A1 * | 7/2017 | Zanaboni et al. | ...... B32B 27/32 |

* cited by examiner

*Primary Examiner* — Nathan M Nutter
(74) *Attorney, Agent, or Firm* — Jason R. Womer

(57) ABSTRACT

Multilayer barrier heat shrinkable films and flexible containers made therefrom, such as bags, pouches and the like, useful for packaging articles, in particular food items are described. These films are characterized by particular shrinking properties, which provide for tight packages reducing the drip loss from the product packaged therein. Moreover, the bags obtained from such films are endowed with very good optical properties and high abuse resistance.

Figure 1:
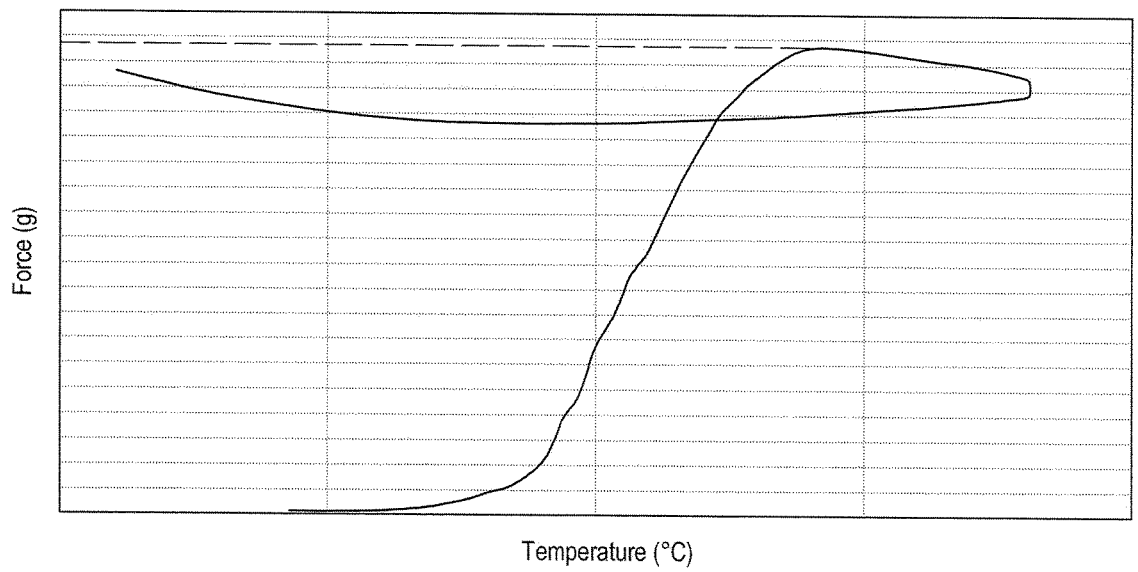

31 Claims, 2 Drawing Sheets

MULTILAYER PVDC BARRIER HEAT SHRINKABLE FILMS

TECHNICAL FIELD

The present invention relates to multilayer PVDC barrier heat shrinkable films comprising very high melting aromatic (co)polyesters and to flexible containers made therefrom, such as bags, pouches and the like, useful for packaging articles, in particular food items. The invention also relates to a process for the manufacturing of such multilayer barrier heat shrinkable films.

BACKGROUND ART

Heat-shrinkable barrier packaging films have long been used for the packaging of a variety of products.

In particular, barrier heat shrinkable films comprising PVDC barrier layers are known and especially appreciated for their very good barrier properties—both under dry and under humid conditions—and for the excellent moisture barrier performance.

However incorporation of PVDC in multilayer films is not devoid of processability problems, due to its chemical and thermal instability, which result in formation of hydrochloric acid, bubbles and in browning of the tape.

In particular, in order to coextrude films comprising both PVDC and high melting polymers—such as polyolefins or polyamides with a melting point generally lower than 200-225° C.—insulated extrusion dies together with incapsulation techniques have been developed to prevent PVDC thermal degradation. Furthermore, in order to be successful in PVDC extrusion, a precise control of the extrusion process is required, in particular on residence time, equipment design and materials used.

However, coextrusion of PVDC together with much higher melting polymers, such as aromatic polyesters having melting temperatures well above, still represents a technical challenge.

Through the years, several efforts have been done in the technical field to increase the stiffness of PVDC comprising films in order to improve their abuse resistance and machinability.

An improved stiffness of the film is generally desirable as results in packages with less leakers, leakers which are due to accidental openings or ruptures during the packaging process or handling of the packages. More rigid films also provide for an improved machinability, which allows to decrease the rejects and increase the speed of the packaging cycles. In fact, a film having good machinability is less subject to creasing, folding, seal pleats, edge curls, or jamming and can be more easily used with any packaging machine. Additionally, more stiff films provide for flexible containers which are easier to be aligned and loaded with the product. Finally, they generally show improved stability during bubble orientation and better printability.

However, in case of shrinkable films, it has been observed that, an increase in the stiffness—achievable for instance by increasing the polyamide content or the number of polyamide layers in the film—often results in inferior shrinking properties or, in case a high shrink is anyway achieved, in worsened optical characteristics after shrink (e.g., gloss, haze). Furthermore, the resulting film is less planar which renders the subsequent converting operations much more difficult.

Concerning the shrinking properties, an ideal packaging film should have the correct balance of free shrink, maximum shrink tension and residual shrink tension in order to provide packages with an appealing appearance and a satisfactory functionality, appearance and functionality which should be preserved under the most common packaging and storage conditions and over time for the entire package life.

Any deviation of the optimal values of said shrinking properties may be detrimental to the performance of the film in the final package.

For instance, too low free shrink values may result in pack appearance unacceptable for the customer due to the looseness of the film and to the presence of wrinkles.

This is particularly true for the vacuum packaging of meat products, particularly fresh meat products. Upon evacuating the atmosphere from the package followed by heat-sealing of the film, the resulting closed package should tightly shrink around the meat product. A film endowed with a sufficiently high free shrink retracts against the product, reducing the excess of film protruding away from the packaged product and improving the appearance and the function of the package.

At this shrinking step, it is essential that the films develop proper free shrink values in both the directions together with an appropriate shrink force. This force must be high enough to tightly enclose the product within the film but without crashing or excessively distorting the final package.

The free shrink and the maximum shrink tension, i.e. the maximum value of tension developed by the films during the heating/shrinking process, are thus parameters very important for achieving an optimal package appearance.

Another important requirement is that the packages should remain tight overtime, during handling and storage.

One common inconvenient that occurs during the storage into the refrigerator is the so called "package relaxation", namely the loss of pack tightness and the appearance of anti-aesthetical wrinkles and pleats in the packaging film. Package relaxation is not only undesirable for purely aesthetical reasons—the presence of wrinkles in the film of the package is not attractive per se—but also because it may impair the visual inspection of the packaged product, and thus instill doubts concerning the freshness and the proper storage of the food.

As far as the Applicant knows, there are several patents which mention the possibility to associate aromatic polyester layers with a PVDC barrier layer in a multilayer shrinkable film.

However, these documents either do not really exemplify structures comprising both these materials or, if they do, they describe manufacturing processes clearly unsuitable or do not provide a disclosure sufficient for replicating said structures, as process and equipment details, needed to allow their real manufacture without damaging the PVDC layer, are totally missing.

EP2147783A1 discloses shrinkable films with improved stack-sealability comprising a PVDC internal barrier layer and an outer polyester layer, in which the polyester is a high melting polyester. The only example discloses a film comprising polybutylene terephthalate (with melting point of 225° C.), characterized by a free shrink at 90° C. of 32% in MD and 32% in TD. No other shrink property is reported therein.

The description is silent on specific equipment and conditions needed for coextrusion, subsequent orientation of the tape and final cooling of the films. Concerning coextrusion, it only mentions that: "The preferred method for the production of the film is coextrusion in a multilayer die" (par. 0049). Concerning orientation and cooling conditions, it refers in very broad terms to "a double bubble method described in U.S. Pat. No. 3,456,044" (par. 0051) but does not provide any detail in merit.

EP2030784 in the name of Cryovac Inc. discloses films comprising an outer heat-sealable layer, an internal PVDC barrier layer and an external abuse layer. No one of the films really exemplified therein includes an aromatic polyester layer, but lower melting polyamides or polystyrenes. This document does not provide any specific shrink value for the exemplified films nor any teaching for specific maximum shrink tension and residual shrink tension values.

In the manufacture process, the PVDC barrier layer is placed in the coating and extruded together with the outer layer. The exemplified films do not experience PVDC thermal damages, as the polymers used in the outer layers, namely the polyamides, their admixtures or the polystyrenes, have melting point significantly lower than aromatic polyesters.

U.S. Pat. No. 8,039,070 in the name of Curwood Inc. relates to peelable barrier shrinkable films. The description generally mentions polyesters among several other polymers as possible components of the film outer layer, but none of the films exemplified therein comprises PVDC and high melting polymers, especially high melting aromatic polyesters. Barrier materials may be selected among ethylene vinyl alcohol copolymers (EVOH), polyacrylonitriles, polyamides, vinylidene chloride copolymers (PVDC), polyglycolide copolymers, and mixtures thereof. All the examples relate to EVOH barrier films.

WO2005011978 in the name of Cryovac Inc. discloses biaxially oriented heat shrinkable films comprising a heat sealable layer, an outer polyester layer and an internal EVOH barrier layer. The manufacturing process comprises coextrusion of all the layers (no substrate plus coating). The EVOH layer is resistant to thermal stress and it is not damaged by the high temperatures applied to extrude the polyesters. The document does not consider PVDC as alternate material for the barrier layer.

U.S. Pat. No. 6,699,549 in the name of Kureha Chemical Inc. discloses films comprising one heat-sealable layer, one outer polyester layer, and optionally an EVOH barrier layer. PVDC as barrier material is not considered. In the manufacturing process, all the layers are coextruded together (no substrate plus coating) as preserving the barrier layer from thermal damaging is not an issue here.

U.S. Pat. No. 6,764,729 in the name of Cryovac Inc. discloses heat shrinkable films comprising a first outer heat-sealable layer and an outer layer comprising polyolefin, polystyrene or a second polyamide. None of the films exemplified therein shows a polyester layer or a PVDC barrier layer. They are manufactured according to a process comprising coextrusion i.e all layers extruded together (no substrate plus coating).

U.S. Pat. No. 4,064,296 in the name of Grace W R & Co. discloses heat shrinkable high barrier, cross-linked films. The barrier polymer is HEVA, the outer layer is made of polyolefins. Further materials are generally listed as possible components of additional layers, but none of the films exemplified therein comprises a polyester layer and/or a PVDC barrier layer.

SUMMARY OF INVENTION

The Applicant, in relation to PVDC barrier heat shrinkable films, has explored the possibility to improve film stiffness, meanwhile preserving optical and shrinking properties by introducing aromatic (co)polyesters in the film structure, in particular in the outer layer.

However, the Applicant experimented that films including high melting polyesters, such as aromatic (co)polyesters, together with a thermolabile PVDC barrier layer, would be hardly obtainable with conventional extrusion dies and/or processes, namely by co-extrusion of all layers—as taught in WO2005011978 or EP2147783—or by extrusion coating of a substrate with a coating, in which the coating comprises both PVDC and PET—as suggested in EP2030784.

In fact, the Applicant found out that by applying conventional processes with traditional extrusion dies to the manufacture of the present films, there may occur so much damage of the PVDC layer that the final film would not be acceptable in terms of color, oxygen transmission and/or optics.

The temperatures required to extrude aromatic (co)polyesters—which may be up to 270-280° C.—are so high to induce partial degradation of the PVDC barrier layer, with appearance of undesired yellow—brown colors, and possible deterioration of gas barrier performance.

In the Applicant's knowledge a complete, sufficiently detailed and reproducible description of a manufacturing process and equipment for preparing multilayer shrinkable films comprising PVDC barrier layer(s) and high melting aromatic (co)polyesters has not been reported in the art.

For instance, EP2147783, which affirms that a film of this kind was prepared, is totally silent on the features of the equipment and on peculiar conditions of the process, features and conditions which appear to be essential for successfully coextrude PVDC and aromatic (co)polyesters.

The other documents, do not show that a film of this kind was really manufactured but simply mentions PVDC or aromatic polyesters as possible alternates of other "compatible" resins (such as EVOH/PET or PVDC/polyolefins or polyamides): they ignore the specific technical problem of coextruding PVDC with PET. In other words, the state of the art does not teach how to solve the problem of manufacturing such films.

On the contrary, the Applicant was able to manufacture PVDC barrier films comprising very high melting aromatic (co)polyesters, even by using conventional equipment, thanks to a new extrusion-coating process.

The Applicant found out that by placing the PVDC thermolabile layer in the substrate and the high melting (co)polyester in the coating, it was possible to preserve PVDC from degradation. In fact, the PVDC layer within the substrate is not heated at a too high temperature, as the high melting aromatic (co)polyesters are in the coating. Furthermore, the Applicant was also able to further minimize heat transmission during the coating of the substrate by inserting a certain thickness of insulating layers between the PVDC layer and the aromatic (co)polyester layer(s).

Finally, the Applicant realized that by using the process herein described, and in the presence of the aromatic polyester layer and the present specific layer arrangement, high amount(s) of polyamide can be incorporated without affecting process stability and further improving abuse resistance. The films so obtained were also easily oriented.

These films show very good barrier, mechanical and optical properties.

Furthermore, these films are surprisingly endowed with very good overall shrinking properties too. In particular, these films, together with high free shrink values, unexpectedly show remarkable residual shrinking performance in the cold. This property solves the drawbacks of package relaxation and dripping of fluids when the shrunk package is stored in a fridge.

Concerning the problem of package relaxation, the Applicant found out that one of the most critical parameter to be measured and, possibly, suitably tuned in order to solve pack relaxation, is the residual shrink tension of the film, namely the tension expressed by the film at low temperatures, particularly at fridge temperatures, generally at about 4-5° C. For previous shrinking films, shrink tensions were conventionally measured at temperatures not lower than room temperature.

Additionally, the control of the residual shrink tension at 5° C. was found to be essential for the solution of another long-felt need in the technical field of meat packaging, i.e. how to minimize drip loss within the package. When fresh meat primals are packed under vacuum and stored, after slaughtering or cooking processes, they start releasing a drip, i.e. a liquid exudate, which is a mixture of serum, proteins and water. This is particularly evident for meat such as pork, beef, veal, horsemeat and processed meat, as for example cooked ham. The drip quantity varies upon the thermal history of the meat and its quality. When the package is opened, the drip is a net weight loss for the retailer or food processor, as the purge cannot be sold by weight.

Additionally, the presence of exudates in the package reduces its attractiveness and makes the retailer suspicious about meat processing and freshness.

The Applicant has surprisingly found that shrinkable films comprising an internal PVDC barrier layer and aromatic (co)polyester(s), retain tightness even after refrigeration and show a reduced drip loss. Specifically, the Applicant has found that in meat packages it is possible to minimize drip loss by using the new packaging films of the present invention endowed with optimal shrink properties, in particular an appropriate residual shrink tension under cold conditions.

Additionally these films show very good processability, at extrusion, orientation and converting levels, and provide for an excellent pack appearance and high abuse resistance.

It is thus a first object of the present invention a multilayer coextruded biaxially oriented barrier heat-shrinkable packaging film comprising at least one heat-sealable layer (a);

one layer (b) which is not directly adhered to the heat sealable layer (a), wherein said layer (b) comprises one or more aromatic (co)polyester(s), at least one internal gas barrier layer (c) comprising polyvinylidene chloride, said film being characterized by A) a total free shrink at 85° C. of at least 45%, preferably at least 55%, more preferably at least 60% and B) a maximum shrink tension in each one of the longitudinal and transverse directions of at least 20 kg/cm$^2$, preferably at least of 25 kg/cm$^2$, more preferably at least of 25 kg/cm$^2$ in each one of the longitudinal and transverse directions and higher than 30 kg/cm$^2$ in at least one of the two directions, and C) a residual shrink tension at 5° C. in each one of the longitudinal and transverse directions at least of 25 kg/cm$^2$ preferably at least of 27 kg/cm$^2$, more preferably at least of 30 kg/cm$^2$.

A second object of the present invention is an article for packaging in the form of a seamless tube, wherein the heat-sealing layer is the innermost layer of the tube, or of a flexible container, such as a pouch or a bag, comprising a film according to the first object.

A third object of the present invention is a package comprising an article according to the second object and a product packaged in said article.

A fourth object of the present invention is a process for the manufacture of a film according to the first object of the present invention.

A fifth object of the present invention is the use of the films according to the first object of the present invention for packaging drippy products, preferably fresh or processed meat.

Definitions

As used herein, the term "film" is inclusive of plastic web, regardless of whether it is film or sheet or tubing.

As used herein, the terms "inner layer" and "internal layer" refer to any film layer having both of its principal surfaces directly adhered to another layer of the film.

As used herein, the phrase "outer layer" or "external layer" refers to any film layer having only one of its principal surfaces directly adhered to another layer of the film.

As used herein, the phrases "seal layer", "sealing layer", "heat seal layer", and "sealant layer", refer to an outer layer involved in the sealing of the film to itself, in particular to the same outer seal layer or to the other outer layer of the same film, to another film, and/or to another article which is not a film.

As used herein, the words "tie layer" or "adhesive layer" refer to any inner film layer having the primary purpose of adhering two layers to each other.

As used herein, the phrases "longitudinal direction" and "machine direction", herein abbreviated "LD" or "MD", refer to a direction "along the length" of the film, i.e., in the direction of the film as the film is formed during coextrusion.

As used herein, the phrase "transverse direction" or "crosswise direction", herein abbreviated "TD", refers to a direction across the film, perpendicular to the machine or longitudinal direction.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is generally fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. The term "coextrusion" as used herein also includes "extrusion coating".

As used herein, the term "extrusion coating" refers to processes by which a "coating" of molten polymer(s), comprising one or more layers, is extruded onto a solid "substrate" in order to coat the substrate with the molten polymer coating to bond the substrate and the coating together, thus obtaining a complete film.

As used herein the terms "coextrusion", "coextruded", "extrusion coating" and the like are referred to processes and multilayer films which are not obtained by sole lamination, namely by gluing or welding together pre-formed webs.

As used herein, the term "orientation" refers to "solid state orientation" namely to the process of stretching of the cast film carried out at a temperature higher than the Tg (glass transition temperatures) of all the resins making up the layers of the structure and lower than the temperature at which all the layers of the structure are in the molten state. The solid state orientation may be mono-axial, transverse or, preferably, longitudinal, or, preferably, bi-axial.

As used herein, the phrases "orientation ratio" and "stretching ratio" refer to the multiplication product of the extent to which the plastic film material is expanded in the two directions perpendicular to one another, i.e. the machine direction and the transverse direction. Thus, if a film has been oriented to three times its original size in the longitudinal direction (3:1) and three times its original size in the transverse direction (3:1), then the overall film has an orientation ratio of 3×3 or 9:1.

As used herein the phrases "heat-shrinkable," "heat-shrink," and the like, refer to the tendency of the solid-state oriented film to shrink upon the application of heat, i.e., to contract upon being heated, such that the size of the film decreases while the film is in an unrestrained state.

As used herein said term refers to solid-state oriented films with a free shrink in both the machine and the transverse directions, as measured by ASTM D 2732, of at least 10%, preferably at least 15%, even more preferably of at least 20% at 85° C.

As used herein the phrases "total free shrink" means a value determined by adding the percent free shrink in the machine (longitudinal) direction to the percentage of free shrink in the transverse (crosswise) direction. The total free shrink is expressed as percentage (%).

As used herein, the term "maximum shrink tension" refers to the maximum value of tension developed by the clamped film samples when subjected to a heating-cooling cycle according to the test method described under the present experimental section. The maximum shrink tension is herein expressed as kg/cm$^2$. By way of example, FIG. 1 show the course of the shrinking force during a heating-cooling cycle; force (g) and Temperature (° C.) are reported on the y-axis and on the x-axis respectively.

As used herein, the term "residual cold shrink tension" refers to the shrink tension that the films show at the temperature of 5° C. after that the complete heating-cooling cycle of the test method has been performed as described under the present experimental section. The residual cold shrink tension is herein expressed as kg/cm$^2$.

As used herein, the phrase "process stability" is interchangeable with the term "processability" and refers to the stability of the film during manufacturing, at extrusion, orientation and converting levels.

As used herein, the term "polymer" refers to the product of a polymerization reaction, and is inclusive of homo-polymers, and co-polymers.

As used herein, the term "homo-polymer" is used with reference to a polymer resulting from the polymerization of a single type of monomer, i.e., a polymer consisting essentially of a single type of mer, i.e., repeating unit.

As used herein, the term "co-polymer" refers to polymers formed by the polymerization reaction of at least two different types of monomers. For example, the term "co-polymer" includes the co-polymerization reaction product of ethylene and an alpha-olefin, such as 1-hexene. When used in generic terms the term "co-polymer" is also inclusive of, for example, ter-polymers. The term "co-polymer" is also inclusive of random co-polymers, block co-polymers, and graft co-polymers.

As used herein, the phrase "heterogeneous polymer" or "polymer obtained by heterogeneous catalysis" refers to polymerization reaction products of relatively wide variation in molecular weight and relatively wide variation in composition distribution, i.e., typical polymers prepared, for example, using conventional Ziegler-Matta catalysts, for example, metal halides activated by an organometallic catalyst, i. e., titanium chloride, optionally containing magnesium chloride, complexed to trialkyl aluminum and may be found in patents such as U.S. Pat. No. 4,302,565 to Goeke et al. and U.S. Pat. No. 4,302,566 to Karol, et al. Heterogeneous catalyzed copolymers of ethylene and an -olefin may include linear low-density polyethylene, very low-density polyethylene and ultra low-density polyethylene. Some copolymers of this type are available from, for example, The Dow Chemical Company, of Midland, Mich., U.S.A. and sold under the trademark DOWLEX resins.

As used herein, the phrase "homogeneous polymer" or "polymer obtained by homogeneous catalysis" refers to polymerization reaction products of relatively narrow molecular weight distribution and relatively narrow composition distribution. Homogeneous polymers are structurally different from heterogeneous polymers, in that homogeneous polymers exhibit a relatively even sequencing of co-monomers within a chain, a mirroring of sequence distribution in all chains, and a similarity of length of all chains, i.e., a narrower molecular weight distribution. This term includes those homogeneous polymers prepared using metallocenes, or other single-site type catalysts, as well as those homogenous polymers that are obtained using Ziegler Natta catalysts in homogenous catalysis conditions.

The co-polymerization of ethylene and alpha-olefins under homogeneous catalysis, for example, co-polymerization with metallocene catalysis systems which include constrained geometry catalysts, i.e., monocyclopentadienyl transition-metal complexes is described in U.S. Pat. No. 5,026,798 to Canich. Homogeneous ethylene/alpha-olefin copolymers (E/AO) may include modified or unmodified ethylene/alpha-olefin copolymers having a long-chain branched (8-20 pendant carbons atoms) alpha-olefin comonomer available from The Dow Chemical Company, known as AFFINITY and ATTANE resins, TAFMER linear copolymers obtainable from the Mitsui Petrochemical Corporation of Tokyo, Japan, and modified or unmodified ethylene/-olefin copolymers having a short-chain branched (3-6 pendant carbons atoms) -olefin comonomer known as EXACT resins obtainable from ExxonMobil Chemical Company of Houston, Tex., U.S.A.

As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and an non-olefinic co-monomer co-polymerizable with the olefin, such as vinyl monomers, modified polymers thereof, and the like. Specific examples include polyethylene homo-polymer, polypropylene homo-polymer, polybutene homo-polymer, ethylene-alpha-olefin which are copolymers of ethylene with one or more -olefins (alpha-olefins) such as butene-1, hexene-1, octene-1, or the like as a comonomer, and the like, propylene-alpha-olefin co-polymer, butene-alpha-olefin co-polymer, ethylene-unsaturated ester co-polymer, ethylene-unsaturated acid co-polymer, (e.g. ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer), ethylene-vinyl acetate copolymer, ionomer resin, polymethylpentene, etc.

As used herein the term "ionomer" refers to the products of polymerization of ethylene with an unsaturated organic acid, and optionally also with an unsaturated organic acid ($C_1$-$C_4$)-alkyl ester, partially neutralized with a mono- or divalent metal ion, such as lithium, sodium, potassium, calcium, magnesium and zinc. Typical unsaturated organic acids are acrylic acid and methacrylic acid which are thermally stable and commercially available. Unsaturated organic acid ($C_1$-$C_4$)-alkyl esters are typically (meth)acrylate esters, e.g. methyl acrylate and isobutyl acrylate. Mixtures of more than one unsaturated organic acid comonomer and/or more than one unsaturated organic acid ($C_1$-$C_4$)-alkyl ester monomer can also be used in the preparation of the ionomer.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith. As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom. As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene-alpha-olefin copolymer" refers to heterogeneous and to homogeneous polymers such as linear low density polyethylene (LLDPE) with a density usually in the range of from about 0.900 g/cm³ to about 0.930 g/cm³, linear medium density polyethylene (LMDPE) with a density usually in the range of from about 0.930 g/cm³ to about 0.945 g/cm³, and very low and ultra low density polyethylene (VLDPE and ULDPE) with a density lower than about 0.915 g/cm³, typically in the range 0.868 to 0.915 g/cm³, and such as metallocene-catalyzed EXACT™ and EXCEED™ homogeneous resins obtainable from Exxon, single-site AFFINITY™ resins obtainable from Dow, and TAFMER™ homogeneous ethylene-alpha-olefin copolymer resins obtainable from Mitsui. All these materials generally include co-polymers of ethylene with one or more co-monomers selected from ($C_4$-$C_{10}$)-alpha-olefin such as butene-1, hexene-1, octene-1, etc., in which the molecules of the copolymers comprise long chains with relatively few side chain branches or cross-linked structures. As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein the term "polyamide" refers to high molecular weight polymers having amide linkages along the molecular chain, and refers more specifically to synthetic polyamides such as nylons. Such term encompasses both homo-polyamides and co-(or ter-) polyamides. It also specifically includes aliphatic polyamides or co-polyamides, aromatic polyamides or co-polyamides, and partially aromatic polyamides or co-polyamides, modifications thereof and blends thereof. The homo-polyamides are derived from the polymerization of a single type of monomer comprising both the chemical functions which are typical of polyamides, amino and acid groups, such monomers being typically lactams or aminoacids, or from the polycondensation of two types of polyfunctional monomers, i.e. polyamines with polybasic acids. The co-, ter-, and multi-polyamides are derived from the copolymerization of precursor monomers of at least two (three or more) different polyamides. As an example in the preparation of the co-polyamides, two different lactams may be employed, or two types of polyamines and polyacids, or a lactam on one side and a polyamine and a polyacid on the other side. Exemplary polymers are polyamide 6, polyamide 6/9, polyamide 6/10, polyamide 6/12, polyamide 11, polyamide 12, polyamide 6/12, polyamide 6/66, polyamide 66/6/10, modifications thereof and blends thereof. Said term also includes crystalline or partially crystalline, aromatic or partially aromatic polyamides.

As used herein, the phrase "amorphous polyamide" refers to polyamides or nylons with an absence of a regular three-dimensional arrangement of molecules or subunits of molecules extending over distances, which are large relative to atomic dimensions. However, regularity of structure exists on a local scale. See, "Amorphous Polymers," in Encyclopedia of Polymer Science and Engineering, 2nd Ed., pp. 789-842 (J. Wiley & Sons, Inc. 1985). This document has a Library of Congress Catalogue Card Number of 84-19713. In particular, the term "amorphous polyamide" refers to a material recognized by one skilled in the art of differential scanning calorimetry (DSC) as having no measurable melting point (less than 0.5 cal/g) or no heat of fusion as measured by DSC using ASTM 3417-83. Such nylons include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, the term "polyester" refers to homopolymers or copolymers (also known as "copolyesters") having an ester linkage between monomer units which may be formed, for example, by condensation polymerization reactions of lactones or by polymerization of dicarboxylic acid(s) and glycol(s). With the term "(co)polyesters" both homo and copolymers are intended.

As used herein, the term "aromatic polyester" refers to homopolymers or copolymers (also known as "copolyesters") having an ester linkage between one or more aromatic or alkylsubstituted aromatic dicarboxylic acids and one or more glycols. The term "(co)polyesters" refer to both homo- and copolymers.

As used herein, the term "adhered" is inclusive of films which are directly adhered to one another using a heat-seal or other means, as well as films which are adhered to one another using an adhesive which is between the two films.

As used herein, the phrase "directly adhered", as applied to layers, is defined as adhesion of the subject layer to the object layer, without a tie layer, adhesive, or other layer therebetween.

In contrast, as used herein, the word "between", as applied to a layer expressed as being between two other specified layers, includes both direct adherence of the subject layer to the two other layers it is between, as well as a lack of direct adherence to either or both of the two other layers the subject layer is between, i.e., one or more additional layers can be imposed between the subject layer and one or more of the layers the subject layer is between.

As used herein the term "gas-barrier" when referred to a layer, to a resin contained in said layer, or to an overall structure, refers to the property of the layer, resin or structure, to limit to a certain extent passage through itself of gases.

When referred to a layer or to an overall structure, the term "gas-barrier" is used herein to identify layers or structures characterized by an Oxygen Transmission Rate (evaluated at 23° C. and 0% R.H. according to ASTM D-3985) of less than 500 $cm^3/m^2 \cdot day \cdot atm$, preferably lower than 100 $cm^3/m^2 \cdot day \cdot atm$, even more preferably lower than 50 $cm^3/m^2 \cdot day \cdot atm$.

As used herein the term "PVDC" refers to vinylidene chloride homopolymers or copolymers.

A PVDC copolymer, comprises a major amount of vinylidene chloride and a minor amount of one or more comonomers. A major amount is defined as one of more than 50%.

As used herein, the phrase "flexible container" is inclusive of end-seal bags, side-seal bags, L-seal bags, U-seal bags (also referred to as "pouches"), gusseted bags, backseamed tubings, and seamless casings.

As used herein, the phrase "an article for packaging in the form of a seamless tube" relates to a tube devoid of any seal which is generally made of a multilayer film (co)extruded through a round die, optionally oriented, wherein the heat-sealing layer a) is the innermost layer of the tube.

As used herein, the term "package" is inclusive of packages made from such articles, i.e. containers or tubes, by placing a product in the article and sealing the article so that the product is substantially surrounded by the heat-shrinkable multilayer film from which the packaging container is made.

As used herein, the term "bag" refers to a packaging container having an open top, side edges, and a bottom edge. The term "bag" encompasses lay-flat bags, pouches, casings (seamless casings and backseamed casings, including lap-sealed casings, fin-sealed casings, and butt-sealed backseamed casings having backseaming tape thereon). Various casing configurations are disclosed in U.S. Pat. No. 6,764,729 and various bag configurations, including L-seal bags, backseamed bags, and U-seal bags (also referred to as pouches), are disclosed in U.S. Pat. No. 6,790,468.

As used herein, the term "dripping products" means products releasing droplets of exudate.

As used herein, the terms "conventional or traditional extrusion dies" refer to extrusion dies which are not suitably modified (insulated) to allow the simultaneous extrusion of PVDC and high melting polymers.

Unless otherwise stated, all the percentages are meant to be percentages by weight.

DETAILED DESCRIPTION OF THE INVENTION

A first object of the present invention is a multilayer coextruded biaxially oriented barrier heat-shrinkable packaging film comprising at least one heat-sealable layer (a);
one layer (b) which is not directly adhered to the heat sealable layer (a),
wherein said layer (b) comprises one or more aromatic (co)polyester(s),
at least one internal gas barrier layer (c) comprising polyvinylidene chloride,
said film being characterized by
A) a total free shrink at 85° C. of at least 45%, preferably at least 55%, more preferably at least 60% and
B) a maximum shrink tension in each one of the longitudinal and transverse directions of at least 20 $kg/cm^2$, preferably at least of 25 $kg/cm^2$, more preferably at least of 25 $kg/cm^2$ in each one of the longitudinal and transverse directions and higher than 30 $kg/cm^2$ in at least one of the two directions, and
C) a residual shrink tension at 5° C. in each one of the longitudinal and transverse directions at least of 25 $kg/cm^2$ preferably at least of 27 $kg/cm^2$, more preferably at least of 30 $kg/cm^2$, The films of the invention are characterized by one or more of the following features, taken alone or in combination.

In one embodiment, the films of the present invention do not comprise any abuse resistant layer d), as hereinafter defined.

In another embodiment, the films of the present invention comprise
one outer heat-sealable layer (a),
one outer layer (b),
wherein said layer (b) comprises one or more aromatic (co)polyester(s),
at least one internal gas barrier layer (c) comprising polyvinylidene chloride, and
at least one internal abuse resistant layer (d).

In another embodiment, the films of the present invention comprise
one outer heat-sealable layer (a),
one outer layer (b),
wherein said layer (b) comprises one or more aromatic (co)polyester(s),
at least one internal gas barrier layer (c) comprising polyvinylidene chloride, and
at least two internal abuse resistant layers (d') and (d").

In another embodiment, the films of the present invention comprise
one outer heat-sealable layer (a),
one outer layer (b),
wherein said layer (b) comprises one or more aromatic (co)polyester(s),
at least one internal gas barrier layer (c) comprising polyvinylidene chloride,
at least two internal abuse resistant layers (d') and (d"),
at least one internal additional layer (e), and
optionally at least one internal additional tie layer (f).

The at least one internal gas barrier layer (c) of the present films comprises at least 70%, at least 80%, at least 90%, at least 95% of polyvinylidene chloride, preferably consists of polyvinylidene chloride. With polyvinylidene choride, homopolymers of vinylidene chloride or its copolymers with other suitable monomers in minor amount are meant. Preferred polymers for the PVDC layer are PVDC copolymers. Especially preferred copolymers are vinylidene chloride-methyl acrylate copolymers, vinylidene chloride-vinyl chloride copolymers, vinylidene chloride-acrylonitrile copolymers and vinylidene chloride-methyl acrylate-vinyl chloride terpolymers.

Preferably, the present films comprise only one internal gas barrier layer (c) comprising polyvinylidene chloride.

In a preferred embodiment, the films of the present invention further comprise at least one abuse resistant layer d), said abuse resistant layer d) comprises polyamides, preferably a blend of aliphatic and aromatic polyamides, such as PA6/66 with PA6I/6T. Preferably, said abuse resistant layer (d) consists of said blend. Preferably said abuse resistant layer (d) is interposed between the heat-sealable layer (a) and the layer (b). Preferably said layer b) is the outermost layer.

Preferably, the total amount of polyamide(s) in the whole film is between 10% and 55%, preferably between 15% and 50%, more preferably 20% and 50%, even more preferably between 20% and 45% by weight.

In a preferred embodiment, when both layers (d') and (d") are present, they have the same composition; in a preferred embodiment they comprise at least one polyamide, preferably a blend of aliphatic and aromatic polyamides Preferably, in such a blend the percentage of said aliphatic polyamides is at least 70%, at least 80% by weight. More preferably, in such a blend the content of the aliphatic polyamide is between 70% and 97%, more preferably between 85% and 95%, and the content of the aromatic polyamide is between 3% and 30%, more preferably between 5% and 15%.

Preferably said layers (d') and (d") consist of said blend.

Preferably the percentage by weight of the sum of the polyamide resin(s) of layers (d') and (d") in the whole film is comprised between 10% and 55%, preferably between 15% and 50%, more preferably 20% and 50°/h, even more preferably between 20% and 45% by weight.

Most preferably in this embodiment the layers (d') and (d") are respectively positioned between the outer heat-sealable layer (a) and the internal PVDC gas-barrier layer (c), and between the internal PVDC gas-barrier layer (c) and the outer layer (b).

In the last case, the layer (d") acts as insulating layer, during the coating of the substrate, thus protecting the PVDC thermo-degradable layer from the excessive heating of the molten outer aromatic (co)polyester layer b).

In one embodiment, one or more further layer(s) are interposed between the at least one internal PVDC layer (c) and the aromatic (co)polyester layer (b), the total thickness of said interposed layer(s) being at least 10%, at least 20%, at least 25%, at least 30% of the total thickness of the film.

Said one or more further layer(s) are preferably selected among abuse resistant d), additional e) and tie f) layers, which are defined herein below.

In case the present film includes more than one internal gas barrier layers comprising PVDC, said one or more further layer(s) are preferably interposed between the aromatic (co)polyester layer (b) and each one of the adjacent PVDC barrier layers.

The films according to the first object of the present invention and to the embodiments depicted above, are characterized by the following shrink properties A), B) and C):

A) A total free shrink at 85° C.
of at least 45%, or
of at least 55%, or
of at least 60%, and
B) a maximum shrink tension
of at least 20 kg/cm$^2$ in each one of LD and TD, or
of at least of 25 kg/cm$^2$ in each one of LD and TD, or
of at least of 25 kg/cm$^2$ in each one of LD and TD and higher than 30 kg/cm$^2$ in at least one of LD and TD, and C) a residual shrink tension at 5° C. in each one of LD and TD
at least of 25 kg/cm$^2$ or
at least of 27 kg/cm$^2$ or
at least of 30 kg/cm$^2$.

Particularly preferred embodiments of the films of the present invention are characterized by the following shrink properties A), B) and C):

A) a total free shrink of at least 55% at 85° C.,
B) a maximum shrink tension of at least of 25 kg/cm$^2$ in each one of LD and TD, and
C) a residual shrink tension in each one of LD and TD at least of 27 kg/cm$^2$ at 5° C.

Most preferred embodiments of the films of the present invention are characterized by the following shrink properties A), B) and C):

A) a total free shrink of at least 60% at 85° C.,
B) a maximum shrink tension of at least of 25 kg/cm$^2$ in each one of LD and TD and higher than 30 kg/cm$^2$ in at least one of LD and TD, and
C) a residual shrink tension in each one of LD and TD at least of 30 kg/cm$^2$ at 5° C.

The packaging films according to the first object of the present invention provide for tight packages when shrunk around the product to be packaged, maintain the initial tightness during package handling and storage under cold conditions, advantageously decreasing the drip loss, especially in case of meat packaging. The shrink properties shown by the present films are mainly due to the presence of certain polymers, preferably in specific amounts and preferred positions within the structure, as better defined below, but can be further tailored onto the product to be packaged and its dimensions, for instance by changing the orientation temperature as known by the skilled in the art.

The total thickness of the multilayer film is generally not higher than 250 microns and can be selected depending on the product to be packaged and on the packaging process. The total thickness of the film is preferably from 10 to 150 microns, more preferably from 20 to 120 microns, even more preferably from 30 to 100 microns.

The numbers of layer of the films according to the present invention is generally comprised between 3 and 50, preferably between 5 and 35, more preferably between 7 and 20, still more preferably lower than 20. In the preferred embodiment, the numbers of layer of the films according to the present invention is comprised between 6 and 15, even more preferably between 7 and 12.

The films according to the first object of the present invention comprise a first outer heat sealable layer (a).

The heat sealable layer (a) comprises one or more of the polymers described in the following paragraphs. Preferably, it comprises more than 50%, 70%, 80%, 90%, 95%, by weight with respect to the same layer, more preferably substantially consists, of one or more of said polymers.

The polymer for the heat-sealable layer is typically selected among ethylene-vinyl acetate copolymers (EVA), homogeneous or heterogeneous, linear ethylene-alpha-olefin copolymers, polypropylene copolymers (PP), ethylene-propylene copolymers (EPC), ionomers, and blends of two or more of these resins.

As used herein, the term "EVA" refers to ethylene and vinyl acetate copolymers. The vinyl acetate monomer unit can be represented by the general formula: [CH$_3$COOCH=CH$_2$].

EVA is a copolymer formed from ethylene and vinyl acetate monomers wherein the ethylene units are present in a major amount and the vinyl-acetate units are present in a minor amount. The typical amount of vinyl-acetate may range from about 5 to about 20%.

Particularly preferred polymer for the heat sealable layer are heterogeneous materials as linear low density polyethylene (LLDPE) with a density usually in the range of from about 0.910 g/cm$^3$ to about 0.930 g/cm$^3$, linear medium density polyethylene (LMDPE) with a density usually in the range of from about 0.930 g/cm$^3$ to about 0.945 g/cm$^3$, and very low and ultra low density polyethylene (VLDPE and ULDPE) with a density lower than about 0.915 g/cm$^3$; and homogeneous polymers such as metallocene-catalyzed EXACT™ and EXCEED™ homogeneous resins obtainable from Exxon, single-site AFFINITY™ resins obtainable from Dow, QUEO by Borealis, TAFMER™ homogeneous ethylene-alpha-olefin copolymer resins obtainable from Mitsui. All these materials generally include co-polymers of ethylene with one or more co-monomers selected from ($C_4$-$C_{10}$)-alpha-olefin such as butene-1, hexene-1, octene-1, etc., in which the molecules of the copolymers comprise long chains with relatively few side chain branches or cross-linked structures.

These polymers can be advantageously blended in various percentages to tailor the sealing properties of the films depending on their use in packaging, as well known by those skilled in the art.

Blends comprising VLDPE polymers, for example AFFINITY PL 1281G1 and AFFINITY PL 1845G or QUEO 1007, are particularly preferred.

In the most preferred embodiment, the sealing layer (a) consists of a blend between two VLDPE resins.

In general, the preferred resins for the heat sealable layer (a) have a seal initiation temperature lower than 110° C., more preferably a seal initiation temperature lower than 105° C., and yet more preferably a sealing initiation temperature lower than 100° C.

The heat-sealable of the film of the present invention can have a typical thickness comprised within the range from 2 to 30 microns, preferably from 3 to 25 microns, more preferably from 4 to 20 microns.

The films of the present invention further comprise a layer (b), which is not directly adhered to the heat sealable layer (a).

Layer (b) comprises one or more aromatic polyester(s) or copolyester(s), herein (co)polyester(s), preferably in amount higher than 50%, 70%, 80%, 90%, 95% by weight with respect to the same layer weight, optionally in admixture with minor amount of aliphatic polyesters. More preferably layer (b) substantially consists of one or more aromatic (co)polyester(s).

Said aromatic (co)polyester(s) are preferably characterized by a melting point higher than 225° C., higher than 230° C., higher than 235° C.

It has been found that the aromatic polyester resin together with the manufacturing method are important to get the combination of free shrink, maximum shrink tension and residual shrink tension according to the first object of the present invention.

Preferably the percentage by weight of the (co)polyester(s) into the whole film is in the range of from 3 to 60%. preferably from 5 to 50%, preferably from 10 to 40%, more preferably from 15 to 40%, from 20 to 40%.

Preferably, the percentage by weight of the aromatic (co)polyester(s) into the whole film is at least 3%, at least 5°/h, at least 10%, at least 12%, at least 15%, at least 20%, at least 25%.

Preferably, layer (b) is the only layer of the present multilayer film comprising aromatic (co)polyester(s).

Layer b) can be an inner layer or the outermost layer of the film according to the first object of the present invention. Preferably, layer (b) is the second outer layer of the present multilayer film.

Preferably, layer (b) is the second outer layer of the present multilayer film and it is the only layer comprising aromatic (co)polyesters.

In a preferred embodiment, the aromatic (co)polyester(s) is present in the outer layer (b) only. In such a case, the percentage by weight of the aromatic (co)polyester(s) into said outer layer (b), with respect to the whole film weight, is at least 3%, at least 5%, at least 10%, at least 12%, at least 15%, at least 20%, at least 25%. Preferably, it is in the range of from 3 to 60%, from 5 to 50%, from 10 to 40%, from 12 to 40%, from 15 to 40%, from 20 to 40%, from 25 to 40%.

Layer (b) can have a typical thickness comprised within the range from 1.5 to 35 microns, preferably from 3 to 30 microns, more preferably from 4 to 25 microns.

In the preferred embodiment according to the first object of the present invention, layer b) is the outermost layer of the film.

As used herein, the term "aromatic (co)polyester" refers to homopolymers or copolymers having an ester linkage between monomer units which may be formed, for example, by condensation polymerization reactions between one or more dicarboxylic acid(s) and one or more glycol(s). The dicarboxylic acid may be aromatic or alkyl substituted aromatic, e.g., various isomers of phthalic acid (i.e., orthophthalic acid), such as isophthalic acid (i.e., meta-phthalic acid), and terephthalic acid (i.e., para-phthalic acid), as well as naphthalic acid. Specific examples of alkyl substituted aromatic acids—herein also called aromatic polyesters—include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The dicarboxylic acid can alternatively be 2,5-furandicarboxylic acid (FDCA). The glycols may be straight-chained or branched. Specific examples include ethylene glycol, propylene glycol, trimethylene glycol, 1,4-butane diol, neopentyl glycol and the like. The glycols include modified glycols such as 1,4 cyclohexane dimethanol.

Suitable aromatic polyesters include poly(ethylene 2,6-naphtalate), poly (butylene terephtalate), poly(ethylene terephthalate), and copolyesters obtained by reacting one or more dicarboxylic acids with one or more dihydroxy alcohols, such as PETG which is an amorphous co-polyesters of terephthalic acid with ethylene glycol and 1,4-cyclohexanedimethanol, and their blends.

In case of blends of (co)polyesters, the aromatic (co) polyester having a melting point higher than 225° C., 230° C., 235° C. is present in a major amount, namely in amount higher than 50%, preferably higher than 70%, more preferably higher than 80%, 90% by weight.

Preferred aromatic (co)polyesters are polyethylene terephthalates (PETs) having melting points higher than 225° C., higher than 230° C., higher than 235° C.

Particularly preferred polyesters are PET polyester resins s supplied by Artenius or Ramapet by Indorama or Eastman polyester resins.

The aromatic (co)polyester in layer b) of the present films can comprise any of the above polyester either alone or in blend.

In a preferred embodiment, the aromatic (co)polyester layer (b) consists of a single aromatic polyester resin, being preferred the PETs Ramapet N180 and Ramapet N1 by Indorama.

More than one aromatic (co)polyester layer b) can be present in the films according to the first object of the present invention.

The films of the present invention are characterized by a total content of polyamides—if present—and aromatic (co) polyesters, expressed as the sum of the percentage by weight of the polyamide(s) and of the aromatic (co)polyester(s), preferably between 30% and 80%, more preferably between 40% and 70%, even more preferably between 45% and 65%.

The films of the present invention comprise at least an internal oxygen barrier layer c) comprising polyvinylidene chloride.

Preferably PVDC comprises a thermal stabilizer (i.e., HCl scavenger, e.g., epoxidized soybean oil) and a lubricating processing aid, which, for example, comprises one or more acrylates.

Polyvinyldene chloride (PVDC) includes copolymers of vinylidene chloride and at least one mono-ethylenically unsaturated monomer copolymerizable with vinylidene chloride. The mono-ethylenically unsaturated monomer may be used in a proportion of 2-40 wt. %, preferably 4-35 wt. %, of the resultant PVDC. Examples of the mono-ethylenically unsaturated monomer may include vinyl chloride, vinyl acetate, vinyl propionate, alkyl acrylates, alkyl methacrylates, acrylic acid, methacrylic acid, and acrylonitrile. The vinylidene chloride copolymer can also be a ter-polymer. It is particularly preferred to use a copolymer with vinyl chloride or $(C_1-C_8)$-alkyl (meth)acrylate, such as methyl acrylate, ethyl acrylate or methyl methacrylate, as the comonomers. It is also possible to use a blend of different PVDC such as for instance a blend of the copolymer of vinylidene chloride with vinyl chloride with the copolymer of vinylidene chloride with methyl acrylate. Blends of PVdC and polycaprolactone (as those described in patent EP2064056 B1, example 1 to 7) are also possible and particularly useful for respiring food products such as some cheeses. The PVDC may contain suitable additives as known in the art, i.e. stabilisers, antioxidizers, plasticizers, hydrochloric acid scavengers, etc. that may be added for processing reasons or/and to control the gas-barrier properties of the resin. Particularly preferred PVDC is IXAN PV910 supplied by Solvin and SARAN 806 by Dow.

Preferably, the barrier layer comprises at least 70%, more preferably at least 80%, 90%, 95% of PVDC.

In the most preferred embodiment, the barrier layer c) consists of PVDC. With the term "consists of" a percentage by weight higher than 98% is meant.

The barrier layer has typically a thickness from 0.1 to 30 µm, preferably 0.2 to 20 µm, more preferably from 0.5 to 10 µm, even more preferably from 1 to 8 µm.

Once the PVDC gas-barrier resin has been selected, its thickness will be set to provide for the desired oxygen transmission rate (OTR). High barrier films will have an OTR (evaluated at 23° C. and 0% R.H. according to ASTM D-3985) below 100 $cm^3/m^2 \cdot day \cdot atm$ and preferably below 80 $cm^3/m^2 \cdot day \cdot atm$ and will be particularly suitable for meat packaging, including fresh red meat and processed meat. Higher OTR for low barrier films will be preferred for packaging e.g. most of the cheeses where generally OTR of from about 100 to about 500 $cm^3/m^2 \cdot day \cdot atm$ are preferred and from about 150 to about 450 $cm^3/m^2 \cdot day \cdot atm$ are mostly preferred.

The present manufacturing processes—in which the PVDC layer is placed within the substrate and the high melting aromatic (co)polyester(s) layer(s) in the coating and, preferably, in which a thick stack of interposing layers is provided between PVDC and aromatic (co)polyester layers—is particularly advantageous in case of medium—low barrier films comprising thin PVDC layer(s), which would be even more damaged by heat.

The films of the present invention can further comprise one or more abuse-resistant layer(s) d).

Layer d) is positioned as inner layer. Preferably, layer d) is positioned between the sealing layer a) and the barrier layer c).

The abuse-resistant layer d) typically has a thickness from 1 to 30 µm, preferably 2 to 25 µm, more preferably from 3 to 20 µm, even more preferably from 5 to 15 µm.

In order to provide abuse resistance, the resins contained in layer d) can be selected among the group consisting of polyamides, (co)polyesters and styrene-based polymers. Blends of such classes of resins can be used.

Useful polyamide homopolymers for layer d) include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like.

Useful polyamide copolymers for layer d) include nylon 6,6/6 copolymer (polyhexamethylene adipamide/caprolactam copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/6,9/6 copolymer (polyhexamethylene adipamide/hexamethylene azelaiamide/caprolactam copolymer), as well as other nylons which are not particularly delineated here. Additional polyamides include nylon 4,I, nylon 6,I, nylon 6,6/6I copolymer, nylon 6,6/6T copolymer, MXD6 (poly-m-xylylene adipamide), nylon 6T/6I copolymer, nylon 6/MXDT/I copolymer, nylon MXDI, poly-p-xylylene adipamide, polyhexamethylene terephthalamide, polydodecamethylene terephthalamide and the like.

Particularly preferred polyamides are ULTRAMID C33 L 01 supplied by BASF, Terpalex, Ube 503X family grades by Ube and Grilon and Grivory by EMS.

In case the at least one internal abuse layer (d) of the present films comprise polyamide(s), the percentage by weight of said polyamide(s) in said layer is preferably at least 70%, 80% 90% by weight, based on said layer(s) weight, most preferably consists of polyamide(s).

Suitable (co)polyesters for layer d) are those aromatic (co)polyesters mentioned for layer (b). Suitable (co)polyesters for layer d) may be also aliphatic (co)polyesters deriving from linear or aliphatic dicarboxylic acid, i.e., oxalic acid, malonic acid, succinic acid, glutaric acid, adipic acid, pimelic acid, suberic acid, azelaic acid, sebacic acid, and the like; the glycols may be straight-chained or branched. Specific examples include ethylene glycol, propylene glycol, trimethylene glycol, 1,4-butane diol, neopentyl glycol and the like. The glycols include modified glycols such as 1,4 cyclohexane dimethanol.

In case the at least one internal abuse layer (d) comprises (co)polyester(s), the percentage by weight of said (co)polyester(s) is preferably between 5% and 40%, preferably between 10% and 30%, even more preferably from 15% to 25% with respect to the whole weight of the film In one embodiment, the lat least one internal abuse layer d) comprises styrene-based polymers.

As used herein, the phrase "styrene-based polymer" refers to at least one polymer selected from the group consisting of polystyrene, styrene-ethylene-butylene-styrene copolymer, styrene-butadiene-styrene copolymer, styrene-isoprene-styrene copolymer, styrene-ethylene-butadiene-styrene copolymer, and styrene-(ethylene-propylene rubber)-styrene copolymer. As used herein the use of a "dash" (i.e., the "—") in a styrene-based polymer formula, is inclusive of both block copolymers and random copolymers. More particularly, the phrase "styrene-based polymer" includes both copolymers in which (i) all named monomers are present as a block, or (ii) any subset of the named monomers are present as a block with the remaining monomers being randomly arranged, or (iii) all named monomers are randomly arranged.

The term "polystyrene" as used herein refers to film grade homopolymers and copolymers of styrene and its analogs and homologs, including -methyl-styrene and ring-substituted styrenes, such as for instance ring-methylated styrenes. This term "polystyrene polymer" is used to identify single polymers or blends of different polystyrene polymers as indicated above.

Particularly preferred resins are Styrolux 684D by BASF, Polystyrol 143E by BASF and K resin KR53 by Chevron Phillips Chemicals which can be used either alone or in blend.

In case the at least one internal abuse layer (d) comprises polystyrene(s), the percentage by weight of said polystyrene(s) is preferably between 5% and 30%, preferably between 10% and 25%, with respect to the whole weight of the film In case more than one layer d) is used, their chemical nature can be independently selected among the group consisting of polyamides, (co)polyesters and styrenes-based polymers and can be the same or different.

In an embodiment, two abuse resistant layers d') and d") are used.

In a preferred embodiment d') and d") are respectively positioned between the sealing layer a) and the internal polyvinylidene chloride gas-barrier layer c) and between the internal polyvinylidene chloride gas-barrier layer c) and the outermost layer b).

In a more preferred embodiment, d') and d") have an identical chemical nature.

In case both d') and d") layers comprise (co)polyester(s), the percentage by weight of the sum of the polyester(s) resin(s) of layers d') and d") in the whole film is preferably from 5% to 40%.

In case both d') and d") layers comprise polystyrene(s), the percentage by weight of the sum of the polystyrene(s) resin(s) of layers d') and d") in the whole film is preferably from 5% to 20%.

Preferably, at least one of d') and d") comprises at least one polyamide.

Even more preferably, d') and d") both comprise one or more polyamide(s). In such a case, preferably d') and d") consist of a blend of an aliphatic with an aromatic polyamide, even more preferably d') and d") each consists of a blend of PA6/66 (Poly-caprolactam/hexamethylenediamine/adipic acid) with PA 6I/6T (Poly-hexamethylenediamine/isophthalic acid/terephthalic acid). Preferably, the content of the aliphatic polyamide is between 70% and 97%, more preferably between 85% and 95%, and the content of the aromatic polyamide is between 3% and 30%, more preferably between 5% and 15%.

Preferably the percentage by weight of the sum of the polyamide resin(s) of layers d') and d") in the whole film is comprised between 10% and 55%, preferably between 15% and 50%, more preferably 20% and 50%, even more preferably between 20% and 45%.

Preferably, in such a blend the percentage of said aliphatic polyamides is at least 70%, 80%, more preferably is at least 90%.

Preferably said layers (d') and (d") consist of said blend

Preferably layers (d') and (d") are respectively positioned between the outer heat-sealable layer (a) and the internal PVDC gas-barrier layer (c), and between the internal PVDC gas-barrier layer (c) and the outer layer (b)

This high amount of polyamide(s) further increases the abuse resistance of these heat-shrinkable films. It was found that, by using the process herein described with this layer configuration, very high amounts of polyamide(s) can be incorporated without affecting the process stability. The films so obtained were also easily oriented.

The films of the present invention can further comprise one or more additional layer(s) e) comprising acrylate-based resin, ethylene-vinyl acetate (EVA) or polyolefins.

The additional layer(s) can be inner layer(s) and/or the outermost layer of the film. Preferably layer(s) e) are inner layers.

Preferably, the one or more additional layer(s) e) are placed between the at least one internal PVDC barrier layer c) and the, preferably outer, aromatic (co)polyester layer b).

As used herein, the phrase "acrylate-based resin" refers to homopolymers, copolymers, including e.g. bipolymers, terpolymers, etc., having an acrylate moiety in at least one of the repeating units forming the backbone of the polymer. In general, acrylate-based resins are also known as polyalkyl acrylates. Acrylate resins or polyalkyl acrylates may be prepared by any method known to those skill in the art. Suitable examples of these resins for use in the present invention include ethylene/methacrylate copolymers (EMA), ethylene/butyl acrylate copolymers (EBA), ethylene/methacrylic Acid (EMAA), ethylene/methyl methacrylate (EMMA), optionally modified with carboxylic or preferably anhydride functionalities, ionomers and the like. Such as LOTRYL 18 MA 002 by Arkema (EMA), Elvaloy AC 3117 by Du Pont (EBA), Nucrel 1202HC by Du Pont (EMAA), Surlyn 1061 by Du Pont (Ionomer).

As used herein, the term "EVA" refers to ethylene and vinyl acetate copolymers. EVA is a copolymer formed from ethylene and vinyl acetate monomers wherein the ethylene units are present in a major amount and the vinyl-acetate units are present in a minor amount, optionally modified with carboxylic or preferably anhydride functionalities. The typical amount of vinyl-acetate may range from about 5 to about 20%. Examples are Escorene FL0014 by Exxon, ELVAX 3165 by Du Pont and EVA 1003 VN4 by Total.

Useful "polyolefin" for the composition of the additional layer are ethylene homo-polymers and ethylene co-polymers, and more preferred are ethylene-alpha-olefin copolymers, particularly those with a density of from about 0.895 to about 0.925 g/cm$^3$, and more preferably of from about 0.900 and about 0.920 g/cm$^3$ and their blends, Particularly preferred ethylene polymers are Affinity or Attane supplied by Dow, Exceed by Exxon and Exact by Dex.

Among the polyolefins, particularly preferred are "polypropylene" (PP) homopolymers or copolymers. PP homopolymers refer to polymers of propylene having a density higher than 0.890 g/cm$^3$, preferably higher than 0.895 g/cm$^3$ and/or a melt flow index MFI from 0.5 to 15 gr/10 min (at 230° C. and 2, 16 kg), preferably from 1.0 to 10 gr/10 min, more preferably from 2.5 to 7.0 gr/10 min.

PP copolymers refer to random copolymers of propylene with ethylene or butene, having an ethylene or butene content not higher than 15%, preferably not higher than 10%, and having a density higher than 0.890 g/cm$^3$, preferably higher than 0.895 g/cm$^3$ and/or a melt flow index MFI from 0.5 to 15 gr/10 min (at 230° C. and 2, 16 kg), preferably from 1.0 to 10 gr/10 min, more preferably from 2.5 to 7.0 gr/10 min; random terpolymers of propylene with ethylene and butene, in which the total amount of ethylene and butene comonomers is not higher than 18%, preferably not higher than 14% and/or the butene/ethylene ratio is higher than 2, preferably higher than 4, having a density higher than 0.890 g/cm$^3$, preferably higher than 0.895 g/cm$^3$ and/or a melt flow index MFI from 0.5 to 15 gr/10 min (at 230° C. and 2, 16 kg), preferably from 1.0 to 10 gr/10 min, more preferably from 2.5 to 7.0 gr/10 min.

Particularly preferred propylene polymers are ELTEX PKS 607 by Solvay, ELTEX PKS359 or PKS350 by Ineos and and Moplen HP515M di Lyondell Basell.

The thickness of layer e) may be comprised within the range 1 to 30 microns, more preferably 1 to 20 microns, even more preferably 1 to 10 microns.

In a preferred embodiment of the present films, these additional layers e), optionally with one or more d) and/or f) layer(s) if present, act as insulating layers during the coating of the substrate, thus protecting the PVDC thermo-degradable layer from the excessive heating coming from the high melting aromatic (co)polyester layer b).

Additional tie layers f), to improve interlayer adhesion, may be present.

Furthermore, tie layers f) also act as insulating layers

Tie layers f) may be disposed between the respective layers in case where a sufficient adhesion is not ensured between adjacent layers. The adhesive resin may comprise one or more polyolefins, one or more modified polyolefins or a blend of the above. Specific, not limitative, examples thereof may include: ethylene-vinyl acetate copolymers, ethylene-(meth)acrylate copolymers, ethylene-alpha-olefin copolymers, any of the above modified with carboxylic or preferably anhydride functionalities, elastomers, and a blend of these resins.

Particularly preferred resins are ADMER NF 538E by Mitsui Chemical, Plexar PX3227X09 or Plexar PX3227 by Lyondell Basell, OREVAC 18211 by Arkema and BYNEL 3101 or Bynel 39E660 or Bynel CXA21 E6787 by DuPont.

The tie layer f) may comprise at least one styrene-based polymer selected from the group consisting of styrene-ethylene-butylene-styrene copolymer, styrene-butadiene-styrene copolymer, styrene-isoprene-styrene copolymer, styrene-ethylene-butadiene-styrene copolymer, and styrene-(ethylene-propylene rubber)-styrene copolymer.

In an embodiment, the inner tie layer comprises the styrene-based polymer in an amount of at least 5 wt %, based on layer weight; or from 5 to 100 wt %, or from 8 to 100 wt %, or from 10 to 100 wt %, or from 10 to 90 wt %, or from 10 to 80 wt %, or from 10 to 60 wt %, or from 10 to 40 wt %, or from 10 to 30 wt %, or from 10 to 25 wt %, or from 10 to 20 wt %, or from 10 to 15 wt %, based on layer weight.

In an embodiment, the styrene-based polymer comprises at least one member selected from the group consisting of: styrene-ethylene-butylene-styrene copolymer, styrene-butadiene-styrene copolymer, styrene-isoprene-styrene copolymer, styrene-ethylene-butadiene-styrene copolymer, styrene-(ethylene-propylene rubber)-styrene copolymer.

In an embodiment, the tie layer f) comprises a blend of the styrene-based polymer and an acrylate based polymer. The styrene-based polymer can make up from 5 to 95 wt % of the blend, and the acrylate based polymer makes up from 5 to 95 wt % of the blend, and the styrene-based polymer and the acrylate based together make up at least 70 wt % of the blend. The styrene-based polymer can make up from 5 to 40 wt % of the blend, and the acrylate based polymer can make up from 60 to 95 wt % of the blend. In an embodiment, the styrene-based polymer can make up from 10 to 20 wt % of the blend, and the acrylate based polymer can make up from 80 to 90 wt % of the blend.

In an embodiment, the tie layer f) comprises a blend of the styrene-based polymer and a cyclic polymer. The styrene-based polymer can make from 5 to 95 wt % of the blend, and the cyclic polymer can make up from 5 to 95 wt % of the blend, with the styrene-based polymer and the cyclic polymer together making up at least 70 wt % of the blend. The styrene-based polymer can make up from 60 to 95 wt % of the blend, and the cyclic polymer can make up from 5 to 40 wt % of the blend. The styrene-based polymer can make up from 80 to 90 wt % of the blend, and the cyclic polymer can make up from 10 to 20 wt % of the blend.

In an embodiment, the tie layer f) comprises a blend of the styrene-based polymer and a modified polyolefin. In an embodiment, the styrene-based polymer can make up from 5 to 95 wt % of the blend, and the modified polyolefin can make up from 5 to 95 wt % of the blend, and the styrene-based polymer and the modified polyolefin together make up at least 70 wt % of the blend. The styrene-based polymer can make up from 5 to 40 wt % of the blend, and the modified polyolefin can make up from 60 to 95 wt % of the blend. The styrene-based polymer can make up from 10 to 20 wt % of the blend, and the modified polyolefin makes up from 80 to 90 wt % of the blend.

In an embodiment, the tie layer f) comprises a blend of the styrene-based polymer, an acrylate based polymer, and a cyclic polymer.

In an embodiment, the styrene-based polymer makes up from 5 to 90 wt % of the blend, the acrylate based polymer makes up from 5 to 90 wt % of the blend, and the cyclic polymer makes up from 5 to 90 wt % of the blend, and the styrene-based polymer, the acrylate based polymer, and the cyclic polymer together make up at least 70 wt % of the blend. The styrene-based polymer can make up from 5 to 40 wt % of the blend, the acrylate based polymer can make up from 20 to 90 wt % of the blend, and the cyclic polymer can make up from 5 to 40 wt % of the blend. The styrene-based polymer can make up from 10 to 20 wt % of the blend, the acrylate based polymer can make up from 30 to 80 wt % of the blend, and the cyclic polymer can make up from 10 to 20 wt % of the blend.

In an embodiment, the tie layer f) comprises a blend of the styrene-based polymer, an acrylate based polymer, and a modified polyolefin. In an embodiment, the styrene-based polymer makes up from 5 to 90 wt % of the blend, the acrylate-based polymer makes up from 5 to 90 wt % of the blend, and the modified polyolefin makes up from 5 to 90 wt % of the blend, the styrene-based polymer, the acrylate-based polymer, and the modified polyolefin together make up at least 70 wt % of the blend. The styrene-based polymer can make up from 5 to 40 wt % of the blend, the acrylate-based polymer can make up from 20 to 90 wt % of the blend, and the modified polyolefin can make up from 5 to 40 wt % of the blend. The styrene-based polymer can make up from 10 to 20 wt % of the blend, the acrylate-based polymer can make up from 30 to 80 wt % of the blend, and the modified polyolefin can make up from 10 to 20 wt % of the blend.

In an embodiment, the tie layer f) comprises a blend of the styrene-based polymer, a cyclic polymer, and a modified olefin copolymer. In an embodiment, the styrene-based polymer makes up from 5 to 90 wt % of the blend, the cyclic polymer, makes up from 5 to 90 wt % of the blend, and the modified olefin copolymer makes up from 5 to 90 wt % of the blend, and the styrene-based polymer, the cyclic polymer, and the modified polyolefin together make up at least 70 wt % of the blend. The styrene-based polymer can make up from 5 to 40 wt % of the blend, the cyclic polymer can makes up from 20 to 90 wt % of the blend, and the modified olefin copolymer can make up from 5 to 40 wt % of the blend. The styrene-based polymer can make up from 10 to 20 wt % of the blend, the cyclic polymer can make up from 30 to 80 wt % of the blend, and the modified olefin copolymer can make up from 10 to 20 wt % of the blend.

In an embodiment, the tie layer f) comprises a blend of the styrene-based polymer, an acrylate based polymer, a cyclic polymer, and a modified polyolefin. The styrene-based polymer can make up from 5 to 85 wt % of the blend, the acrylate-based polymer can make up from 5 to 85 wt % of the blend, the cyclic polymer can make up from 5 to 85 wt % of the blend, and the modified polyolefin can make up from 5 to 85 wt % of the blend, with the styrene-based polymer, the acrylate-based polymer, the cyclic polymer and the modified polyolefin together making up at least 70 wt % of the blend. The styrene-based polymer can make up from 10 to 40 wt % of the blend, the acrylate-based polymer can make up from 10 to 40 wt % of the blend, the cyclic polymer can make up from 10 to 40 wt % of the blend, and the modified polyolefin can make up from 10 to 40 wt % of the blend. The styrene-based polymer can make up from 10 to 20 wt % of the blend, the acrylate-based polymer can make up from 10 to 80 wt of the blend, the cyclic polymer can make up from 5 to 20 wt % of the blend, and the modified polyolefin can make up from 10 to 80 wt % of the blend.

If the tie layer f) comprises a modified polyolefin, the modified polyolefin can comprise at least one member selected from the group consisting of a grafted anhydride functionality, a copolymerized anhydride functionality, and a blend of the polyolefin and another polymer having an anhydride functionality.

If the tie layer f) comprises an acrylate-based polymer, the acrylate based polymer can comprise at least one member selected from the group consisting of ethylene/methyl acrylate copolymer, ethylene/ethyl acrylate copolymer, ethylene/butyl acrylate copolymer, and ethylene/vinyl acetate copolymer.

If the tie layer f) comprises a cyclic polymer, the cyclic polymer can comprise at least one member selected from the group consisting of ethylene/norbornene copolymer, and ethylene/tetracyclododecene copolymer, and cyclic olefin polymer.

The tie layer f) may comprise a polymer blend comprising:
from 50% to 85% by weight of at least a modified ethylene-alpha-olefin copolymer;
from 50% to 15% by weight of at least a modified ethylene and vinyl acetate copolymer having a percentage by weight of vinyl acetate between 6% and 15%, preferably:
from 60% to 80% by weight of at least a modified ethylene-alpha-olefin copolymer;
from 40% to 20% by weight of at least a ethylene and vinyl acetate copolymer having a percentage by weight of vinyl acetate between 6% and 15%,
even more preferably:
from 65% to 75% by weight of at least a modified ethylene-alpha-olefin copolymer;
from 35% to 25% by weight of at least a ethylene and vinyl acetate copolymer having a percentage by weight of vinyl acetate between 6% and 15%.

In a preferred embodiment, the inner layer consists of said copolymers in said amounts.

The modified ethylene-alpha-olefin copolymer generally include co-polymers of ethylene with one or more co-monomers selected from (C4-C10)-alpha-olefin such as butene-1, hexene-1, octene-1, etc., in which the molecules of the copolymers comprise long chains with relatively few side chain branches or cross-linked structures.

The modified ethylene-alpha-olefin copolymers, which can be used for the blend according to the first object of the invention, are selected among modified heterogeneous and homogeneous polymers, such as modified linear low density polyethylene (LLDPE) with a density usually in the range of from about 0.900 g/cm3 to about 0.930 g/cm3, modified linear medium density polyethylene (LMDPE) with a density usually in the range of from about 0.930 g/cm3 to about 0.945 g/cm3, and modified very low and ultralow density polyethylene (VLDPE and ULDPE) with a density lower than about 0.915 g/cm3, typically in the range 0.868 to 0.915 g/cm3.

The term "modified ethylene-alpha-olefin copolymer" refers to ethylene-alpha-olefin copolymer having an anhydride functionality, as defined immediately below, grafted thereon and/or copolymerized therewith and/or blended therewith.

Preferably, such modified polymers have the anhydride functionality grafted on or polymerized therewith, as opposed to merely blended therewith.

As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom. Particularly preferred are maleic anhydride grades.

In the preferred embodiment, the density of the modified ethylene-alpha-olefin copolymer is in the range 0.905 g/cc to 0.927 g/cc, even more preferably in the range 0.910 g/cc to 0.920 g/cc.

The Melt Flow Index of the of the modified ethylene-alpha-olefin copolymer, measured at 190° C., 2.16 kg (ASTM D1238) is generally in the range from 2 to 10 g/10 min, preferably at least 3 g/10 min, even more preferably at least 4 g/10 min.

Particularly preferred are Admer® NF 538E (anhydride modified very low density polyethylene, density 0.91 g/cc, melt index 4.1 g/10 min at 190° C., 2.16 kg) and Admer® NF518E (Maleic Anhydride-Modified Polyethylene, Linear Low Density, density 0.91 g/cc, melt index 3.1 g/10 min at 190° C., 2.16 kg) commercialised by Mitsui.

Other commercially available resins which can be used are for example: Bynel 4125 by DuPont (Melt Flow Index 2.5 g/10 min at 190° C., 2.16 kg, density 0.926 g/cc), Plexar PX3243 by the LyondellBasell (Melt Flow Index 4.5 g/10 min at 190° C., 2.16 kg, density 0.927 g/cc), Amplify TY 1354 by Dow (Melt Flow Index 3.0 g/10 min at 190° C., 2.16 kg, density 0.92 g/cc).

The ethylene-vinyl acetate copolymer (EVA) are copolymer between ethylene and vinyl acetate, (this monomer is represented by the general formula: CH3COOCH=CH2).

In the modified EVA copolymer, the ethylene units are present in a major amount and the vinyl-acetate units are present in a minor amount. The typical amount of vinyl-acetate may range from about 5 to about 20%. For the blend according to the first object of the present invention, the percentage by weight of vinyl acetate has to be between 6% and 15%, preferably between 8% and 13%.

The Melt Flow Index of such resins is typically in the range 2.0 to 5.5 g/10 min, preferably 2.5-4.5 g/10 min (measured at 190° C., 2.16 kg, as per ASTM D1238).

The melting point of such resins is preferably comprised in the range from 87° C. to 100° C.

The term "modified ethylene-vinyl acetate copolymer" refers to ethylene-vinyl acetate copolymer having an anhydride functionality, as defined immediately below, grafted thereon and/or copolymerized therewith and/or blended therewith.

Preferably, such modified polymers have the anhydride functionality grafted on or polymerized therewith, as opposed to merely blended therewith.

As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom. Particularly preferred are maleic anhydride grades.

Exemplary commercially available modified EVA resins are: Bynel 3101 by DuPont, Bynel 30E671 by Du Pont, Orevac 9314 by Arkema.

Preferably, the blend used in the inner tie layer comprises from 65% to 75% by weight of at least a modified ethylene-alpha-olefin copolymer having a density between 0.910 and 0.920 g/cc and from 35% to 25% by weight of at least a modified ethylene and vinyl acetate copolymer having a percentage by weight of vinyl acetate between 6% and 15%, more preferably between 8% and 13%.

According to one embodiment, a tie layer f) is directly adhered to the outer film layer.

According to another embodiment, a tie layer (f) is directly adhered on each side of the barrier layer (c). The composition of the two tie layers (f) can be the same or different, depending on the chemical nature of the further layers adjacent to said two tie layers. In the preferred embodiment, the tie layers (f) adjacent to PVDC have the same composition.

According to another embodiment, a tie layer (f) is directly adhered on one side of the abuse layer (d) or (d').

The thickness of the one or more additional layer(s) d) and/or e) and/or f) interposed between the internal PVDC layer (c) and the polyester layer (b), is at least 20%, preferably at least 25%, more preferably at least 30% of the total film thickness.

In all the film layers, the polymer components may contain appropriate amounts of additives normally included in such compositions. Some of these additives are preferably included in the outer layers or in one of the outer layers, while some others are preferably added to inner layers.

These additives include slip and anti-block agents such as talc, waxes, silica, and the like, antioxidants, stabilizers, plasticizers, fillers, pigments and dyes, cross-linking inhibitors, cross-linking enhancers, UV absorbers, odour absorbers, oxygen scavengers, antistatic agents, anti-fog agents or compositions, and the like additives known to those skilled in the art of packaging films.

Exemplary, non-exhaustive layers sequences of the films of the present inventions are herewith listed:
a/f/c/f/b, a/f/d/f/c/f/b, a/f/c/f/d/f/b, a/f/d'/c/d"/f/b, a/e/f/c/f/e/f/b, a/f/d'/f/c/f/f/d"/f/b, a/f/d'/f/c/f/f/d"/f/b a/e/f/c/f/b, a/f/c/f/e/f/b, a/f/b/f/c/f/e, a/f/b/f/e/f/c/f/e, a/f/b/f/e/f/c/f/d, a/f/c/f/b/f/e, a/f/c/f/e/f/b, a/f/b/f/e/f/c/f/d, a/f/d'/c/d"/f/e/b, a/e/f/d'/c/d"/f/e/b, . . . .

wherein:

a,b,c,d, d',d", e and f have the same meaning as previously described and when the same letter is written more than once in a sequence, those letters can represent layers having identical or different chemical nature.

Preferred layers sequences for the films of the present invention are the following: a/f/c/f/b, a/f/d/f/c/f/b, a/f/c/f/d/f/b, a/f/d'/c/d"/f/b, a/e/f/c/f/e/f/b, a/f/d'/f/c/f/f/d"/f/b, a/f/d'/f/c/f/d"/f/b a/e/f/c/f/b, a/f/c/f/e/f/b, a/f/c/f/e/f/b, a/f/d'/c/d"/f/e/b, a/e/f/d'/c/d"/f/e/b.

Most preferred layers sequences for the films of the present invention are the following:
a/e/f/c/f/e/f/b, a/f/d'/c/d"/f/b, a/f/d'/f/c/f/f/d"/f/b, a/f/d'/f/c/f/d"/f/b, a/f/d'/c/d"/f/e/b, a/e/f/d'/c/d"/f/e/b.

The films according to the present invention are heat-shrinkable, i.e. they show a % free shrink in each one of LD and TD direction of at least 10% at 85° C. (according to ASTM D2732), preferably at least 15%, even more preferably of at least 20% at 85° C. and a total free shrink at 85° C. of at least 45%, preferably at least 55%, even more preferably at least 60%.

The films according to the present invention show a maximum shrink tension of at least 20 kg/cm$^2$ in each one of LD and TD, preferably at least of 25 kg/cm$^2$ in each one of LD and TD, more preferably at least of 25 kg/cm$^2$ in one of LD and TD and higher than 30 kg/cm$^2$ in the other one of the two directions, measured as described under the experimental part of the present description.

The films according to the present invention show a maximum shrink tension of at most 55 kg/cm$^2$, preferably 50 kg/cm$^2$, even more preferably 45 kg/cm$^2$ in at least one of the two directions LD and TD.

The films according to the present invention show a residual shrink tension in each one of LD and TD at least of 25 kg/cm$^2$ preferably at least of 27 kg/cm$^2$, more preferably at least of 30 kg/cm$^2$ at 5° C., measured as described under the experimental part of the present description.

The films of the present invention show very good processability and are able to withstand high orientation ratios in both the directions.

Additionally, due to their stiffness the films of the present invention can be printed by any printing method known in the art.

The films of the present invention are endowed with good optical properties.

In particular, the present films are characterized by haze values before shrink lower than 20%, preferably lower than 15%, more preferably lower than 12, measured according to ASTM D1003. Furthermore, the present films are characterized by gloss values before shrink higher than 110 g.u., preferably higher than 120 even more preferably higher than 130 g.u., measured according to ASTM D2457.

Particularly preferred embodiments of the present films are the following:

i) a multilayer coextruded biaxially oriented barrier heat-shrinkable packaging film comprising
one outer heat-sealable layer (a);
one outer layer (b) which is not directly adhered to the heat sealable layer (a),
wherein said layer (b) comprises one or more aromatic (co)polyester(s), having a melting point higher than 225° C.,
at least one internal gas barrier layer (c) consisting of polyvinylidene chloride,
said film being characterized by
A) a total free shrink at 85° C. of at least 45%, and
B) a maximum shrink tension in each one of the longitudinal and transverse directions of at least 20 kg/cm$^2$ and
C) a residual shrink tension at 5° C. in each one of the longitudinal and transverse directions at least of 25 kg/cm$^2$,
wherein the total free shrink is measured according to ASTM D2732, the maximum shrink tension and the residual shrink tension are measured according to the method of the present description, or ii) a multilayer coextruded biaxially oriented barrier heat-shrinkable packaging film comprising
one outer heat-sealable layer (a);
one outer layer (b) which is not directly adhered to the heat sealable layer (a),
wherein layer (b) is the only layer comprising aromatic (co)polyesters and
wherein said layer (b) comprises one or more polyethylene terephthalates having a melting point higher than 225° C. and
wherein the percentage by weight of the polyethylene terephthalates into the whole film is at least 15%,
at least one internal gas barrier layer (c) consisting of polyvinylidene chloride,
said film being characterized by
A) a total free shrink at 85° C. of at least 45%, and
B) a maximum shrink tension in each one of the longitudinal and transverse directions of at least 20 kg/cm2 and
C) a residual shrink tension at 5° C. in each one of the longitudinal and transverse directions at least of 25 kg/cm2,
wherein the total free shrink is measured according to ASTM D2732, the maximum shrink tension and the residual shrink tension are measured according to the method of the present description, or iii) a multilayer coextruded biaxially oriented barrier heat-shrinkable packaging film comprising
one outer heat-sealable layer (a);
one outer layer (b) which is not directly adhered to the heat sealable layer (a),
wherein layer (b) is the only layer comprising aromatic (co)polyesters and
wherein said layer (b) comprises one or more polyethylene terephthalates having a melting point higher than 225° C. and
wherein the percentage by weight of the polyethylene terephthalates into the whole film is at least 5%,
at least one internal gas barrier layer (c) consisting of polyvinylidene chloride,
at least two internal abuse resistant layers (d') and (d"), having the same composition and comprising at least 90% by weight of a blend of aliphatic and aromatic polyamides;
wherein the percentage by weight of said polyamides in the whole the film is between 20% and 50%;
said film being characterized by
A) a total free shrink at 85° C. of at least 45%, and
B) a maximum shrink tension in each one of the longitudinal and transverse directions of at least 20 kg/cm2 and
C) a residual shrink tension at 5° C. in each one of the longitudinal and transverse directions at least of 25 kg/cm2,
wherein the total free shrink is measured according to ASTM D2732, the maximum shrink tension and the residual shrink tension are measured according to the method of the present description, or iv) a multilayer coextruded biaxially oriented barrier heat-shrinkable packaging film comprising
one outer heat-sealable layer (a);
one outer layer (b) which is not directly adhered to the heat sealable layer (a),
wherein layer (b) is the only layer comprising aromatic (co)polyesters and
wherein said layer (b) comprises one or more polyethylene terephthalates having a melting point higher than 225° C. and
wherein the percentage by weight of the polyethylene terephthalates into the whole film is at least 5%,
at least one internal gas barrier layer (c) consisting of polyvinylidene chloride,
wherein one or more further layer(s) selected among abuse resistant d), additional e) and tie f) layers are interposed between the at least one internal PVDC layer (c) and the outer polyester layer (b), the total thickness of said interposed layer(s) being at least 20% of the total thickness of the film,
said film being characterized by
A) a total free shrink at 85° C. of at least 45%, and
B) a maximum shrink tension in each one of the longitudinal and transverse directions of at least 20 kg/cm2 and
C) a residual shrink tension at 5° C. in each one of the longitudinal and transverse directions at least of 25 kg/cm2,
wherein the total free shrink is measured according to ASTM D2732, the maximum shrink tension and the residual shrink tension are measured according to the method of the present description.

A second object of the present invention is an article for packaging in the form of a seamless tube wherein the heat-sealing layer is the innermost layer of the tube or in the form of a flexible container such as a pouch or a bag comprising a film according to the first object.

The article in the form of a seamless tube can be manufactured by extrusion coating through a round die of the layers of the present films as previously defined, followed by, optional irradiation, and by trapped bubble orientation, as described below.

The resulting seamless tube can be directly processed to furnish flexible packaging containers or, in alternative, can be converted to a flat film by slitting before being winded into rolls or being further re-processed.

The flexible container is obtainable by heat-sealing the film to itself.

The self-sealing of the film to form a flexible container according to the present invention can be accomplished in a fin seal and/or lap seal mode, preferably by having the heat sealable layer heat sealed to itself, i.e. in a fin seal mode.

The heat-shrinkable flexible containers can be in the form of an end-seal bag (ES), a side (or transverse TS) seal bag or a pouch.

In one embodiment, the flexible container is a lay-flat, end-seal bag made from a seamless tubing, the end-seal bag having an open top, first and second folded side edges, and an end seal across a bottom of the bag.

In one embodiment, the flexible container is a lay-flat, side-seal bag made from a seamless tubing, the side-seal bag having an open top, a folded bottom edge, and first and second side seals.

In one embodiment, the flexible container is a lay-flat, V-shaped side-seal bag made from a seamless tubing, the side-seal bag having an open top, a folded bottom edge, and first and second side seals. Said first and second side seals can be completely angled with respect to the open top, thus providing a triangular or almost triangular bag or, preferably, can be partially straight (i.e. perpendicular to the open top) and partially angled, conferring a more trapezium-like shape.

In one embodiment, the flexible container is a lay-flat pouch made by heat sealing two flat films to one another, the pouch having an open top, a first side seal, a second side seal and a bottom seal.

The flexible container optionally comprises at least one tear initiator.

The films of the present invention can be supplied in rolls and formed as pouches on conventional horizontal machine such as for example Flow Wrapper (HFFS) supplied by ULMA. In this kind of packaging machine, the product is packaged in a pouch shrunk around the product and having three-seals: two transverse seals and one longitudinal seal.

Pouches can also be formed just before being filled, for example according to Vertical Form Fill Seal (VFFS) packaging systems. The VFFS process is known to those skilled in the art and described for example in U.S. Pat. No. 4,589,247. The product is introduced through a central, vertical fill tube to a formed tubular film having been sealed longitudinally and transversely at its lower end. The pouch is then completed by sealing the upper end of the tubular segment, and severing the pouch from the tubular film above it Other bag and pouch making methods known in the art may be readily adapted to make receptacles or containers from the multilayer film according to the present invention.

A third object of the present invention is a package comprising an article for packaging according to the second object and a product packaged in said article.

In packaging, the product will be loaded into a heat-shrinkable bag made of the film of the invention, the bag will normally be evacuated, and the open end thereof will be closed by heat-sealing or by applying a clip, e.g. of metal. This process is advantageously carried out within a vacuum chamber where the evacuation and application of the clip or heat seal is done automatically. After the bag is removed from the chamber it is heat shrunk by applying heat. This can be done, for instance, by immersing the filled bag into a hot water bath or conveying it through a hot water shower or a hot air tunnel, or by infrared radiation. The heat treatment will produce a tight wrapping that will closely conform to the contour of the product therein packaged.

A common method of packaging food and non-food products is by means of pouches made on form-fill-seal machines, such as a Horizontal Form-Fill-Seal (HFFS) or a Vertical Form-Fill Seal (VFFS) machine.

A FFS machine, either Horizontal or Vertical, typically includes a former for forming a flat web of film into a tubular configuration, a longitudinal sealer to seal the overlapped longitudinal edges of the film in the tubular configuration, a conveyor for feeding the products into the tubular film one after the other in suitably spaced configuration, or a feeding tube in case of a VFFS machine, and a transverse sealer for sealing the tubular film in a cross-wise direction to separate the products into discrete packages.

The transverse sealer may be operated to simultaneously seal the bottom of the leading pouch and the front of the following pouch and sever the two seals as well as the leading package from the front sealed tubing.

Alternatively, in the HFFS process, the transverse seal may be operated to sever the leading package from the following tubular portion and sealing the front of said tubular portion thus creating the sealed bottom of the next leading pouch. In this way the leading pouch containing the product to be packaged has a longitudinal seal and only one transverse seal. It can then be vacuumized before a second transverse seal hermetically closes it. Also in this case, the oriented heat-shrinkable thermoplastic film of the present invention is employed as the packaging material and the vacuumized package is then shrunk to achieve the desired appearance.

In the FFS processes, while the transverse seals are always fin seals, the longitudinal seal can be either a fin seal or a lap seal, i. e. a seal where the innermost heat sealable layer of the film is sealed to the outermost layer of the same film.

The polymers used for the thermoplastic packaging material and in particular for the heat sealing layer are selected in such a way to provide high seal strengths. This in fact guarantees that the final flexible container will suitably protect the packaged product from the outside environment, without accidental openings or leakers.

The outermost or external layer must also be carefully selected for its heat resistance during the sealing step. For example it is advantageous to select for this layer a polymer having melting point higher than the sealing temperature.

A barrier heat shrinkable bag from a film of the invention has wide applications, preferably for food packaging, particularly for meat, poultry, cheese, processed and smoked meat, pork and lamb. The shrink properties of the film will in fact guarantee a complete shrinkage of the bag around the product, so that the bag is not wrinkled, thus offering an attractive package also reducing the drip loss. The bag will have proper abuse resistance in order to physically survive the process of being filled, evacuated, sealed, closed, heat shrunk, boxed, shipped, unloaded, and stored at the retail supermarket, and a sufficient stiffness to improve also its loading process.

A fourth object of the present invention is a process for the manufacture of a film according to the first object of the present invention.

The manufacturing process according to the present invention provides for co-extrusion of a substrate comprising the thermolabile PVDC based barrier layer(s) (c), under mild temperatures and conditions, and the subsequent coating of the substrate with a sequence of layers comprising the high melting aromatic (co)polyester layer (b), heated at higher temperatures.

In such a way, the Applicant was able to prevent the thermal degradation of the PVDC barrier layer c), even without using thermally insulated extrusion dies. Advantageously, the new process avoids the expensive interruptions of the production cycles and prevents the generation of toxic gases associated with PVDC burnings.

In case the present film includes more than one internal PVDC gas barrier layers (C) they will be all conveniently placed within the substrate structure.

In such a way, the Applicant was able to prevent the thermal degradation of the PVDC barrier layer(s) c), using traditional, non-isolated extrusion dies.

Accordingly, a process, for the manufacturing of the film of the first object of the present invention, comprises the steps of:

co-extruding, through a round die, a tubular substrate comprising at least a sealant layer a) on the inside of the tube and a barrier layer c) comprising PVDC;

quenching such substrate tube at temperatures between 5-15° C., preferably at 8-10° C., after extrusion;

extrusion-coating the substrate with a coating comprising at least a layer b), thus obtaining an un-oriented tubular film;

quenching the un-oriented tubular film at temperatures between 5° C. and 30° C., preferably between 20 and 30° C.;

heating the tubular film to a temperature which is above the Tg of all the polymeric resins composing the layers and below the melting temperature of at least one of the resins employed;

biaxially orienting the tubular film at orientation ratios from about 2 to about 6, preferably between 3 and 5, even more preferably between 3.1 and 4.5 in each one of longitudinal and transverse directions;

quenching the oriented tubular film, preferably in cold air, at a temperature from 4° C. to 30° C., preferably from 5° C. to 10° C.

It was found that this combination of process and layer configuration is particularly advantageous to prepare the films of the present invention which comprise barrier resins such as PVDC and its copolymers, which tend to degradation at high temperatures.

Preferably the process according to the present invention comprises the steps of:

coextruding, through a round die, a tubular substrate comprising at least a sealant layer a) on the inside of the tube, at least one barrier layer c) comprising PVDC and, optionally, an abuse resistant layer d'), preferably between the sealant layer a) and the PVDC barrier layer c);

quenching such substrate tube at temperatures between 5-15° C., preferably at 8-10° C., after extrusion;

extrusion-coating the substrate with a coating comprising at least a layer b), and optionally, an abuse resistant layer d") thus obtaining an un-oriented tubular film;

quenching such un-oriented tubular film at temperatures between 5° C. and 30° C., preferably between 20 and 30° C.;

heating the tubular film to a temperature which is above the Tg of all the polymeric resins composing the layers and below the melting temperature of at least one of the resins employed;

biaxially orienting the tubular film at orientation ratios from about 2 to about 6, preferably between 3 and 5, even more preferably between 3.1 and 4.5 in each one of longitudinal and transverse directions, and quenching the oriented tubular film, preferably in cold air, at a temperature from 4° C. to 30° C., preferably from 5° C. to 10° C.

Another process according to the present invention comprises the steps of:

coextruding, through a flat die, a flat substrate comprising at least a sealant layer a), at least one barrier layer c) comprising PVDC and, optionally, an abuse resistant layer d');

quenching such substrate at temperatures between 5-15° C., preferably at 8-10° C., after extrusion;

extrusion-coating the substrate with a coating comprising at least a layer b), and optionally, an abuse resistant layer d") thus obtaining an un-oriented flat tape;

quenching such un-oriented tape at temperatures between 5° C. and 30° C., preferably between 20 and 30° C.;

heating the tape to a temperature which is above the Tg of all the polymeric resins composing the layers and below the melting temperature of at least one of the resins employed;

biaxially orienting the tapea by tenterframe, sequentially or simultaneously, preferably simultaneously, at orientation ratios from about 2 to about 6, preferably between 3 and 5, even more preferably between 3.1 and 4.5 in each one of longitudinal and transverse directions, and quenching the oriented film, preferably in cold air, at a temperature from 4° C. to 30° C., preferably from 5° C. to 10° C.

The multilayer substrate can be manufactured by coextrusion, for instance as described in U.S. Pat. No. 3,891,008, using either a flat or a circular film die that allows shaping the polymer melt into a tape or a tube, According to a preferred process, the multilayer substrate is co-extruded through a round die to obtain a tube of molten polymeric material which is quenched immediately after extrusion without being expanded, and optionally cross-linked The coextrusion of the substrate, is generally performed at temperatures not higher than 250° C., preferably from 160 to 240° C., preferably from 170 to 230° C.

The coating step can be simultaneous, by coextruding all the remaining layers altogether, so as to simultaneously adhere all of them, one over the other, to the quenched tube obtained in the first coextrusion step, or this coating step can be repeated as many times as the layers which are to be added.

The coating of the substrate is generally effected by heating the resins of the coating at temperatures up to 280° C., typically from 200° C. to 270° C.

During extrusion-coating the tube will be slightly inflated just to keep it in the form of a tube and avoid that it collapses.

The optionally cross-linked tape or tube is then biaxially oriented.

In case of a tube, orientation is preferably effected according to the so called trapped bubble process. The tube is heated to a temperature which is above the Tg of all the resins employed and below the melting temperature of at least one of the resins employed, typically by passing it through a hot water bath, or alternatively by passing it through an IR oven or a hot air tunnel, and expanded, still at this temperature by internal air pressure to get the transverse orientation and by a differential speed of the pinch rolls which hold the thus obtained "trapped bubble", to provide the longitudinal orientation. The heating temperature of the tube or of the tape ranges from 70 to 98° C. depending on several factors such as the nature and amount of each resin within the tube, the thickness of the tube, the orientation ratios to be achieved as known to the skilled in the art.

Typical orientation ratios for the films of the present invention can be comprised between about 2 and about 6 in each one of the longitudinal and transverse direction, preferably between 3 and 5 in each direction, even more preferably between 3.1 and 4.5 in each direction.

After having been stretched, the film is quickly cooled, preferably in cold air, at temperature between 4 e 30° C., preferably between 5-10° C., while substantially retaining its stretched dimensions to somehow freeze the molecules of the film in their oriented state and rolled for further processing.

In a preferred embodiment, the films according to the first object of the present invention are manufactured by extrusion coating followed by trapped-bubble orientation.

Alternatively, the film according to the present invention may be obtained by flat extrusion coating and biaxial stretching by a simultaneous or a sequential tenterframe process.

In a preferred embodiment, the films according to the first object of the present invention are manufactured by round die extrusion-coating followed by trapped-bubble orientation process.

The present manufacturing method includes the preparation of a first substrate by co-extrusion of some of the structure layers (at least the sealant layer a) and the PVDC barrier layer c) and the subsequent deposition thereon of a coating comprising at least the aromatic 8 co)polyester layer b) and the optional remaining layers, by extrusion coating.

Preferably, one or more further layer(s), selected among abuse resistant d), additional e) and tie f) layers, are present in the substrate and/or in the coating with the aim to improve the abuse performance of the final films, to bond adjacent layers and to contribute to the thermal insulation of the PVDC barrier layer c).

These layers are suitably placed in the substrate and/or in the coating, thus providing a protective stack of layers interposed between the gas-barrier layer (c) and the polyester layer (b). Preferably, the total thickness of said interposed layer(s) is at least 20%, at least 25%, at least 30% of the total thickness of the film.

If desired, the film or a portion of it may be cross-linked, chemically or, preferably, by irradiation, in order to improve mechanical properties and orientability. Typically to produce cross-linking, the substrate or the coated substrate is treated with a suitable radiation dosage of high energy electrons, preferably using an electron accelerator, with the dosage level being determined by standard dosimetry methods. Depending on the characteristics desired, this irradiation dosage can vary from about 20 to about 200 kGy, preferably from about 30 to about 150 kGy.

Other accelerators such as a Van der Graff generator or resonating transformer may be used.

The radiation is not limited to electrons from an accelerator since any ionizing radiation may be used.

The films according to the first object of the present invention are preferably not irradiated. This is particularly the case when at least one abuse resistant layer d) as described herein is present in the film structure.

In such a case the films already have the suitable mechanical properties for being easily oriented, for standing the packaging process and the handling of the packages so obtained and do not need to be irradiated. Advantageously, the non irradiated film will have better sealing properties.

In the most preferred embodiment, both layers d') and d") comprise at least one polyamide and the percentage by weight of the sum of the polyamide resin(s) of layers d') and d") in the whole film is comprised between 10% and 55%, preferably between 15% and 50%, more preferably 20% and 50%, even more preferably between 20% and 45% by weight.

This high amount of polyamide is desirable to confer high abuse resistance to these heat-shrinkable films and it was found that, by using the process herein described with this layer configuration, a high amount of polyamide can be incorporated without affecting process stability and shrinking properties. The films so obtained were also easily oriented.

The films of the present invention show very good processability and are able to withstand high orientation ratios.

The films of the present invention can be easily printed.

Methods for printing the films of the present invention include any conventional method of printing of plastic materials well known in the art.

A film obtainable according to anyone of the processes described herein is also object of the present invention.

A fifth object of the present invention is the use of the films according to the first object of the present invention for packaging dripping products, preferably fresh or processed meat as the following experiments illustrate.

EXAMPLES

The present invention can be further understood by reference to the following examples that are merely illustrative and are not to be interpreted as a limitation to the scope of the present invention that is defined by the appended claims.

In the following examples the polymers indicated in Table 1 below have been employed.

TABLE 1

| Tradename, Supplier | Chemical Nature | Acronym | Properties & Parameters |
|---|---|---|---|
| AFFINITY PL 1281G1, DOW | Polyethylene, Very Low Density Ethylene/Octene Copolymer - Branched, Single Site | VLDPE1 | Comonomer content 13%, Melt Flow Rate (Cond. 190° C./ 02.16 kg (E)) 6 g/10 min, Melting Point 99° C. |
| AFFINITY PL 1845G, DOW | Polyethylene, Very Low Density Ethylene/Octene Copolymer - Linear, Single Site | VLDPE2 | Density 0.91 g/cm$^3$ Melt Flow Rate (Cond. 190° C./02.16 kg (E)) 3.5 g/10 min |
| QUEO 1007 Borealis | Polyethylene, Very Low Density Ethylene/Octene Copolymer - Linear, Single Site | VLDPE3 | Density 0.910 g/cm$^3$, Melt Flow Rate (Cond. 190° C./ 02.16 kg (E)) 6.6 g/10 min |
| AFFINITY PL 1881G, DOW | Polyethylene, Very Low Density Ethylene/Octene Copolymer - Branched, Single Site | VLDPE4 | Density 0.904 g/cm$^3$, Melt Flow Rate (Cond. 190° C./ 02.16 kg (E)) 1 g/10 min, Melting point 100° C., Vicat softening point 88° C. |
| AFFINITY PL 1880G, DOW | Polyethylene, Very Low Density Ethylene/Octene Copolymer - Branched, Single Site | VLDPE5 | Density 0.902 g/cm$^3$, Melt Flow Rate (Cond. 190° C./ 02.16 kg (E)) 1.1 g/10 min, Melting point 99° C., Vicat softening point 86° C. |
| ADMER NF 538E, Mitsui Chemical | Maleic Anhydride-Modified Polyethylene, Very Low Density | VLDPE-mod | Density 0.91 g/cm$^3$, Melt Flow Rate (Cond. 190° C./ 02.16 kg (E)) 4.1 g/10 min, Vicat softening point 8° C. |
| EXCEED 2018CA, ExxonMobil | Polyethylene, Linear Low Density Ethylene/Hexene Copolymer - Linear, Single Site | LLDPE | Density 0.918 g/cm$^3$, Melt Flow Rate (Cond. 190° C./ 02.16 kg (E)) 2 g/10 min, Melting Points 108° C. and 118° C. |

TABLE 1-continued

| Tradename, Supplier | Chemical Nature | Acronym | Properties & Parameters |
|---|---|---|---|
| Plexar PX3227X09, Lyondell Basell | Maleic Anhydride-Modified Polyethylene, Linear Low Density Blend - Rubber-Modified | LLDPE-mod | Density 0.913 g/cm$^3$, Melt Flow Rate (Cond. 190° C./02.16 kg (E)) 1.70 g/10 min, Melting Point 124° C. |
| ELVAX 3165, DuPont | Ethylene/Vinyl Acetate Copolymer | EVA1 | Comonomer content 18%; Density 0.94 g/cm$^3$, Melt Flow Rate (Cond. 190° C./02.16 kg (E)) 0.7 g/10 min, Melting Point 87° C. |
| ELVAX 3170, DuPont | Ethylene/Vinyl Acetate Copolymer | EVA2 | Comonomer content 18% Density 0.94 g/cm$^3$, Melt Flow Rate (Cond. 190° C./02.16 kg (E)) 2.5 g/10 min, Melting Point 90° C. |
| 1003 VN4, Total Petrochemicals | Ethylene/Vinyl Acetate Copolymer | EVA3 | Comonomer content 13.5%, Melt Flow Rate (Cond. 190° C./02.16 kg (E)) 0.38 g/10 min, Melting Point 93° C. |
| OREVAC 18211, Arkema | Maleic Anhydride-Modified Ethylene/Vinyl Acetate Copolymer | EVA-mod1 | Comonomer content 25%, Density 0.95 g/cm$^3$, Melt Flow Rate (Cond. 190° C./02.16 kg (E)) 3.5 g/10 min, Melting Point 72° C. |
| BYNEL 3101, DuPont | Acid/Acrylate Modified Ethylene/Vinyl Acetate Copolymer | EVA-mod2 | Comonomer content 18.4% Density 0.943 g/cm$^3$, Melt Flow Rate (Cond. 190° C./02.16 kg (E)) 3.2 g/10 min, Melting Point 87° C., Vicat softening point 65° C. |
| BYNEL CXA 21E787 DuPont | Maleic Anhydride-Modified Ethylene/Methyl Acrylate Copolymer | EMA-md | Density 0.930 g/cm$^3$, Melt Flow Rate (Cond. 190° C./02.16 kg (E)) 1.6 g/10 min, Melting Point 92° C., Vicat softening point 57° C. |
| NUCREL 1202 HC DuPont | Ethylene/Methacrylic Acid Copolymer | EMAA | Comonomer content 12%, Density 0.94 g/cm$^3$, Melt Flow Rate (Cond. 190° C./02.16 kg (E)) min-1.2-max 1.8 g/10 min, Melting Point 95° C. |
| IXAN PV910, Solvin | Vinylidene Chloride/Methyl Acrylate Copolymer - Stabilized | PVDC-MA | Bulk (Apparent) Density min 0.78 g/cm$^3$, Comonomer content 8.1%, Density 1.71 g/cm$^3$, Viscosity Relative min-1.44-max 1.48, Viscosity Solution 1.46 mPA.sec |
| AFFINITY PL 1880G, DOW | Polyethylene, Homogeneous ethylene-alpha-olefin, Ethylene/Octene Copolymer | EAO1 | Density 0.902 g/cm$^3$, Melt Flow Rate (Cond. 190° C./02.16 kg (E)) 1.1 g/10 min, Melting Point 99° C., Vicat softening point 86° C. |
| ULTRAMID C 33 L01, BASF | Polyamide - 6/66, Lubricated Poly(caprolactam/hexamethylenediamine/adipic acid) | PA6/66 | Density 1.12 g/cm$^3$, Melting Point 196° C. |
| Grivory G21 Natural, EMS-Grivory | Polyamide, Amorphous - Poly(hexamethylenediamine/isophthalic acid/terephthalic acid | PA6I/6T | Density 1.82 g/cm$^3$, Glass transition temperature 125° C., Melt Flow Rate (Cond. 275° C./5 kg) 20 g/10 min |
| RAMAPET N180, Indorama | Polyester, copolymer of terephthalic acid, isophthalic acidand mono-ethylene glycol | PET1 | Density Solid Stated pellets 1.4 g/cm$^3$, Intrinsic Viscosity 0.80 dl/g, Glass transition temperature 78° C., Melting point 245° C. |
| Ramapet N1, Indorama | Polyester, copolymer of terephthalic acid, isophthalic acid and mono-ethylene glycol | PET2 | Density Solid Stated pellets 1.39 g/cm$^3$, Intrinsic Viscosity 0.80 dl/g, Glass transition temperature 78° C., Melting point 247° C. |
| Artenius Global, Artenius | Polyethylene Terephthalate | PET3 | Bulk (Apparent) Density 0.84 g/cm$^3$, Density 1.39 g/cm$^3$ Viscosity Solution 0.82 mPa.sec, melting range 240-250° C. |

The examples according to the invention and the comparative examples have been collected in the Table 2.

The film of Comparative Example 2 was manufactured according to the process shown in EP2030784 for preparing films having a polyamide outer layer instead of the present aromatic (co)polyester outer layer. In particular, the process described in Example 1 of EP2030784 comprises extrusion coating of a substrate with a coating comprising both the PVDC and the outer polyamide layer. Furthermore, the film of Comparative Example 2 comprises a stack of insulating layer between the barrier and the outer layer having a thickness of about 9.7% of the total film thickness, namely a thickness within the range used for the corresponding interposing layers of previous similar films disclosed in EP2030784 and WO2005011978. As can be appreciated from the experimental data below, the prior art teachings would not allow the manufacture of the present films: in fact, neither the extrusion coating disclosed in EP2030784—in which the PVDC and the high melting polymer layer are de facto coextruded—nor plausibly the coextrusion taught in WO2005011978, preserved the PVDC thermolabile layer from damage.

The layers of Table 2 are reported in their order of extrusion, from the sealing layer indicated as layer 1 to the outermost layer (the latest listed).

The multilayer films according to the present invention (Examples 1-3) and the comparative films 1 and 2 have been prepared by extrusion coating through a round die of a substrate consisting of:
layer 1 to layer 6 for Example 2 and 3;
layer 1 to layer 5 for Example 1;
layer 1 to layer 3 for Comparative examples 1 and 2.

The extruded multilayer tubular substrates thus obtained were then
quenched with a water cascade at 8° C.,
irradiated at 64 KGys (only for Comparative Example 1, while Example 1, 2, 3 and Comparative Example 2 were not irradiated), and
extrusion coated with: layers 7 to layers 10 for Examples 2 and 3, layers 6 to layers 8 for Example 1 and Layers 4 to Layers 6 for Comparative Examples 1 and 2

The coated tube obtained in Examples 1-3 and Comparative 2 is then rapidly quenched at 25° C. in water, the tube obtained in Comparative Example 1 is quenched at 12° C. in water; then the obtained tubes for all the Examples and

TABLE 2

| Examples | Example 1 | Example 2 | Example 3 | Comparative 1 | Comparative 2 |
|---|---|---|---|---|---|
| Layers | Total thickness 60.1 μm | Total thickness 90 μm | Total thickness 74.9 μm | Total thickness 50.1 μm | Total thickness 59.9 μm |
| Layer 1 (heat sealant, a) | 80% VLDPE1 20% VLDPE2 (7.8 μm) | 80% VLDPE1 20% VLDPE2 (13.8 μm) | 80% VLDPE1 20% VLDPE2 (11.9 μm) | 80% VLDPE1 20% VLDPE3 (9.7 μm) | 80% VLDPE1 20% VLDPE2 (8.1 μm) |
| Layer 2 | 80% EAO1 20% LLDPE (8.8 μm) (additional, e) | 70% EVA-mod1 30% VLDPE-mod (8.7 μm) (tie, f) | 70% EVA-mod1 30% VLDPE-mod (8.5 μm) (tie, f) | 60% EAO1 40% EMAA (14.9 μm) (additional, e) | 80% VLDPE5 20% LLDPE (16.1 μm) (additional, e) |
| Layer 3 | 100% EVA2 (3.9 μm) (tie, f) | 90% PA6/66 10% PA6I/6T (17.7 μm) (abuse resistant, d') | 90% PA6/66 10% PA6I/6T (11.9 μm) (abuse resistant, d') | 100% EVA1 (7.5 μm) (tie, f) | 100% EVA2 (5.00 μm) (additional, e) |
| Layer 4 | 100% PVDC-MA (5.4 μm) (barrier, c) | 70% EVA-mod1 30% VLDPE-mod (5.2 μm) (tie, f) | 70% EVA-mod1 30% VLDPE-mod (5.1 μm) (tie, f) | 100% PVDC-MA (4.7 μm) (barrier, c) | 100% PVDC-MA (5.5 μm) (barrier, c) |
| Layer 5 | 100% EVA2 (3.9 μm) (tie, f) | 100% PVDC-MA (4.8 μm) (barrier, c) | 100% PVDC-MA (4.7 μm) (barrier, c) | 100% EVA1 (7.5 μm) (tie, f) | 100% EMA-md (7.1 μm) (tie, f) |
| Layer 6 | 100% EAO1 (7.8 μm) (additional, e) | 70% EVA-mod1 30% VLDPE-mod (3.5 μm) (tie, f) | 70% EVA-mod1 30% VLDPE-mod (3.4 μm) (tie, f) | 70% VLDPE4 30% EVA3 (9.3 μm) (additional, e) | 100% PET3 (18.1 μm) (layer b) |
| Layer 7 | 100% LLDPE-mod (4.9 μm) (tie, f) | 100% EVA-mod2 (4.3 μm) (tie, f) | 100% EVA-mod2 (4.3 μm) (tie, f) | | |
| Layer 8 | 100% PET2 (17.6 μm) (layer b) | 90% PA6/66 10% PA6I/6T (17.7 μm) (abuse resistant, d") | 90% PA6/66 10% PA6I/6T (11.9 μm) (abuse resistant, d") | | |
| Layer 9 | | 100% EVA-mod2 (4.8 μm) (tie, f) | 100% EVA-mod2 (4.7 μm) (tie, f) | | |
| Layer 10 | | 100% PET1 (9.5 μm) (layer b) | 100% PET1 (8.5 μm) (layer b) | | |

Comparative example 2 (except for Comp. 1) were biaxially oriented by passing them through a hot water bath kept at a temperature of 94° C., while for Comp. 1 the temperature was 90° C., then the tubes were inflated to get transverse orientation and stretched by pinch rolls to get longitudinal orientation.

The orientation ratios were:

about 3.4:1 in the longitudinal direction and 3.4:1 in the transverse direction for Ex. 1;

about 3.7:1 in the longitudinal direction and 4:1 in the transverse direction for Comp. 1;

about 3.4:1 in the longitudinal direction and 3.3:1 in the transverse direction for Comp. 2.

Finally, the obtained tubes were cooled in cold air at 7° C.

During the manufacturing of the films of the present invention (Examples 1 to 3), very good process stability, in particular at extrusion coating in terms of quality of the tube, and at orientation of no bubble bursts, increased line speed and high draw ratios, even if the films were not cross-linked, and without negative effect on the optical properties, were observed with respect to the comparative examples.

Additionally, no degradation of the PVDC layer, due to overheating during extrusion or to the contact with other warm layers present in the structure was observed.

On the contrary, during the manufacturing of the tube of the comparative film 2, in particular during the coating of the substrate, degradation of PVdC was observed. In fact, bubbles were formed in the melt and the colour of the resulting tape was brown. After 20 minutes of extrusion-coating, the situation was even worse, with formation of die beards due to an extensive degradation and so the collection of the tube was stopped.

Notwithstanding the unacceptable appearance of the tape, brown because of PVDC thermal degradation and not transparent due to the presence of trapped bubbles, it was biaxially oriented as described above. The resulting film (Comparative example 2) was not fit for use because opaque, due to the presence of the same but enlarged bubbles, and slightly yellowish to the naked eye.

Figure 2:
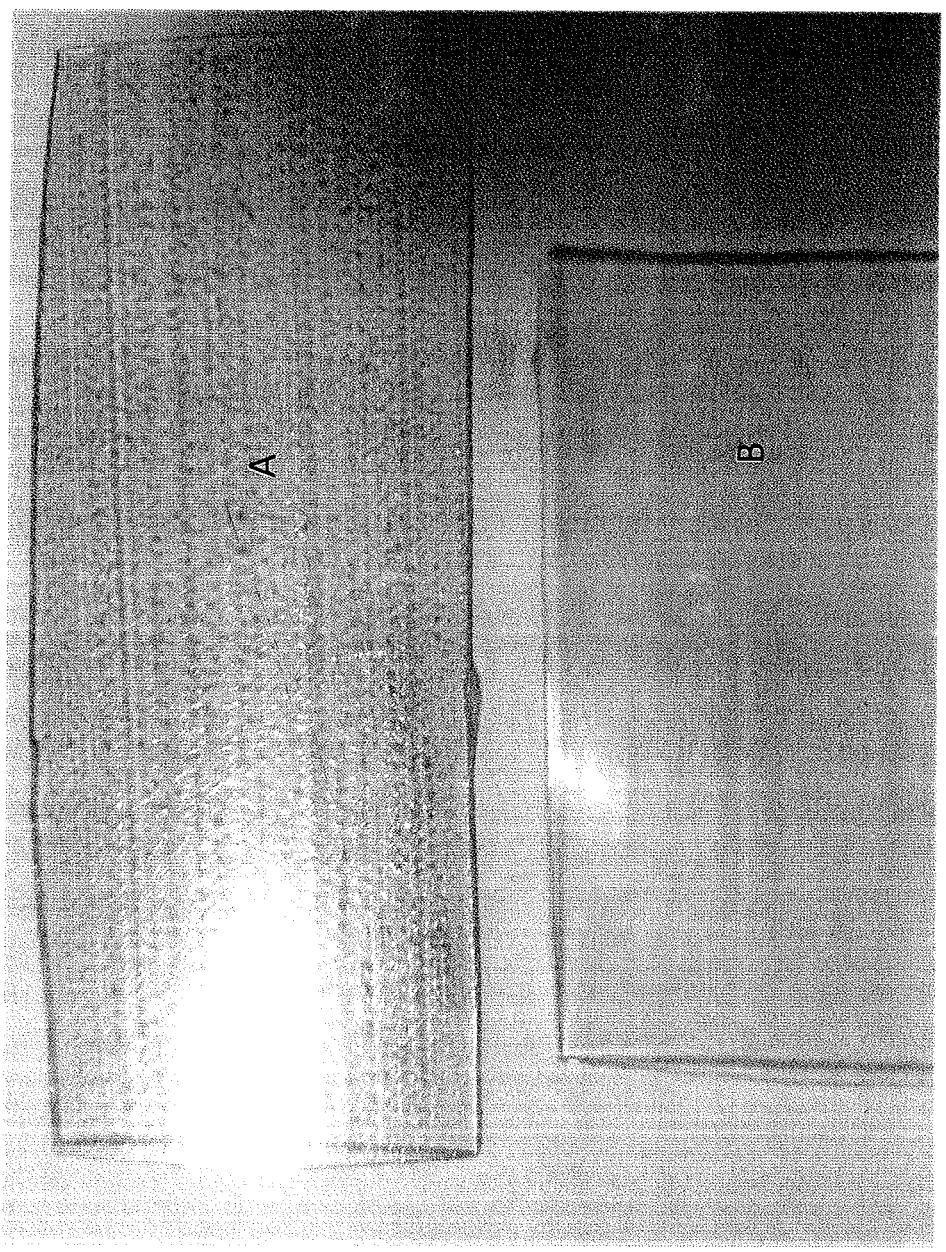

The very bad appearance and optics—see the picture of the tube in FIG. 2—were sufficient per se to discard the film.

The test methods used for properties evaluations are summarized in the following Table 3

TABLE 3

| Property | Test method |
|---|---|
| Free shrink at 85° C. | ASTM D2732 |
| Maximum and residual shrink tensions | Internal method MSTRST see description below |
| Drip Loss Test | Internal method see description below |
| Puncture at 23° C. | Internal method see description below |
| Tensile Strength and Elongation at break at 23° C. | ASTM D882 |
| Elastic Modulus at 23° C. | ASTM D882 |
| Haze | ASTM D1003 |
| Gloss 60° | ASTM D2457 |

Free Shrink: it is the percent dimensional change in a 10 cm×10 cm specimen of film when subjected to a selected heat; it has been measured following ASTM Standard Test Method D 2732, immersing the specimen for 5 seconds in a water bath heated at 85° C. The results of this test are reported in Table 4.

Maximum shrink tension (kg/cm$^2$) and residual cold shrink tension (at 5° C.) (kg/cm$^2$) were measured through an internal method MSTRST as described in the following paragraph.

The maximum shrink tension is the maximum value of the tension developed by the materials during the heating/shrinking process. Specimens of the films (2.54 cm×14.0 cm, of which 10 cm are free for testing) are cut in the longitudinal (LD) and transverse (TD) directions of the film and clamped between two jaws, one of which is connected to a load cell. The two jaws keep the specimen in the centre of a channel into which an impeller blows heated or cold air and two thermocouples measure the temperature. The thermocouples are positioned as close as possible (less than 3 mm) to the specimen and in the middle of the same. The signals supplied by the thermocouples (which is the testing temperature) and by the load cell (which is the force) are sent to a computer where the software records these signals. The impeller starts blowing hot air and the force released by the sample is recorded in grams. The temperature is increased from 23° C. to 90° C. at a rate of about 3.2° C./second by blowing heated air and then decreased from 90° C. to 5° C. at a rate of 0.9° C./second by blowing cold air. The maximum shrink tension is calculated by dividing the maximum force value in kg (force at peak) by the specimen width (expressed in cm) and by the specimen average thickness (expressed in cm) and is expressed as kg/cm$^2$. The residual cold shrink tension is calculated by dividing the force (in kg) exerted by the specimen at 5° C. and the specimen width (in cm) and the specimen average thickness (in cm) and is expressed as kg/cm$^2$. Three specimens were measured for each film in each direction. The results of this test are reported in Table 4.

Drip loss was measured through an internal method. The meat was kept in carcass 24 h at 2° C. then it was deboned, trimmed and cut before vacuum packaging.

32 striploins (of a weight of from 1.7 to 3.4 kg each, 4 pieces cut from 8 steers) were packed with each of the bags tested (Example 1 and Comparative Example 1) on a Cryovac VS30 machine with the following settings:

vacuum level: 5 mBar seal time, 1.5 sec cooling time, 2 sec seal setting Ultraseal, 350 T shrink of the packages at 85° C., by immersion in a hot water dip tank for 3 seconds.

The packages were stored 19 days under vacuum at 2±2° C. 32 packages were evaluated for Example 1 and 32 packages were evaluated for Comparative Example 1. The drip loss was calculated (in percentage on the weight of the meat) by subtracting, from the total weight of each pack, the weight of the dry package and the dry meat, the difference being the weight of the liquid which exudated during the storage. The average results of this test are reported in Table 4. The 0.3% difference in total drip loss values, between the chunks packaged using Example 1 and Comparative Example 1, is significant at the 95% level of confidence when submitted to a Student test.

Puncture at 23° C.: the puncture resistance is the resistance force arising when pushing a punch against a surface of flexible film. A film sample is fixed in a specimen holder connected to a compression cell mounted on a dynamometer (an Instron tensile tester); when the dynamometer is started, a punch (a punching sphere, 5-mm in diameter, soldered on a plunger) is brought against the film sample at a constant speed (30 cm/min) and the force needed to puncture the sample is graphically recorded. This test is representative of the abuse resistance of the packaging films. The results of this test are reported in Table 5.

Tensile Strength and Elongation at Break (ASTM D 882).

Tensile strength represents the maximum tensile load per unit area of the original cross-section of the test specimen required to break it, expressed as kg/cm$^2$.

Elongation at break represents the increase in length of the specimen, measured at the moment of rupture expressed as percentage of the original length. Measurements were performed with Instron tensile tester equipped with a load cell type CM (1-50 kg), in an environmental chamber set at 23° C., on specimens previously stored at 23° C. and 50% RH for minimum of 24 hours. Tensile and elongation measurements were recorded simultaneously and the reported results are the average values. The results of this test are reported in Table 5.

Elastic modulus at 23° C.: it has been evaluated following ASTM D 882. The results of this test are reported in Table 5.

Haze: it has been evaluated following ASTM D1003. The results of this test are reported in Table 5.

Gloss 60°: it has been evaluated following ASTM D2457. The average value of the measurements performed in longitudinal and transversal direction was reported. The results of this test are reported in Table 5.

As shown in FIG. 2, which is an enlarged picture of a sample (A) taken from the tube of the Comparative Example 2 and of a sample (B) taken from the tube of the Example 3, the simultaneous presence in the coating of the PVDC layer and the PET layer, according to the manufacturing process suggested in EP2030784, resulted in a damaged and brownish tape. In fact it is evident from the picture the presence of several bubbles.

As shown in Table 4, the films of the present invention showed high free shrink values and high maximum shrink tension values. Additionally, these films resulted able to develop high residual shrink tensions values in cold conditions, thus guaranteeing a very good pack appearance during storage of the packages and a reduction in the drip loss from the meat.

Moreover, these films have very good mechanical and optical properties, as demonstrated by data reported in Table 5.

In conclusion, the films of the present invention allow obtaining excellent pack appearance and meat drip loss reduction, still keeping very good processability at extrusion and converting level and guaranteeing high abuse resistance.

TABLE 4

|  | Example 1 | | Example 2 | | Example 3 | | Comparative example 1 | |
| --- | --- | --- | --- | --- | --- | --- | --- | --- |
|  | LD | TD | LD | TD | LD | TD | LD | TD |
| FREE SHRINK (%) at 85° C. | 40 | 46 | 24 | 35 | 25 | 35 | 40 | 46 |
| TOTAL FREE SHRINK (%) at 85° C. | 86 | | 59 | | 60 | | 86 | |
| MAXIMUM SHRINK TENSION (Kg/cm²) | 33 | 43 | 27 | 36 | 26 | 38 | 31 | 22 |
| Residual shrink tension at 5° C. (Kg/cm²) | 31 | 40 | 29 | 38 | 29 | 38 | 9 | 6 |
| Total Drip Loss (%) | 0.79 | | | | | | 1.08 | |

TABLE 5

|  | Example 1 | | Example 2 | | Example 3 | | Comparative example 1 | |
| --- | --- | --- | --- | --- | --- | --- | --- | --- |
|  | LD | TD | LD | TD | LD | TD | LD | TD |
| tensile strength (kg/cm²) | 1050 | 1100 | 1160 | 1210 | 1100 | 1320 | 800 | 800 |
| elongation (%) | 150 | 130 | 130 | 130 | 190 | 120 | 120 | 140 |
| Modulus (kg/cm²) | 10800 | 13300 | 8450 | 8230 | 8120 | 8070 | 2600 | 2600 |
| puncture 23° C. (g) | 10350 | | 24000 | | 17700 | | 9050 | |
| haze (%) | | | 12 | | 9 | | 7 | |
| gloss 60° (g · u.) | | | 134 | | 148 | | 110 | |

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

The invention claimed is:

1. A multilayer coextruded biaxially oriented barrier heat-shrinkable packaging film comprising:
   (A) an outer heat-sealable layer (a);
   (B) a layer (b) which is not directly adhered to the heat sealable layer (a), wherein said layer (b) comprises at least one member selected from aromatic polyester and aromatic copolyester; and
   (C) at least one internal gas barrier layer (c) comprising polyvinylidene chloride, said film being characterized by a total free shrink at 85° C. of at least 45%, a maximum shrink tension in each one of the longitudinal and transverse directions of at least 20 kg/cm², and a residual shrink tension at 5° C. in each one of the longitudinal and transverse directions at least of 25 kg/cm², and wherein the total free shrink is measured according to ASTM D2732, the maximum shrink tension and the residual shrink tension are measured according: internal method MSTRST.

2. The film according to claim 1 wherein said at least one member selected from aromatic polyester and aromatic copolyester is characterized by a melting point higher than 225° C.

3. The film according to claim 1 wherein layer (b) is the second outer layer.

4. The film according to claim 1 wherein layer (b) is the only layer comprising the at least one member selected from aromatic polyester and aromatic copolyester.

5. The film according to claim 1 wherein the percentage by weight of the at least one member selected from aromatic polyester and aromatic copolyester is at least 3%, based on whole film weight.

6. The film according to claim 1, wherein the percentage by weight of the at least one member selected from aromatic polyester and aromatic copolyester is from 3 to 60%, based on whole film weight.

7. The film according to claim 1, wherein the at least one member selected from aromatic polyester and aromatic copolyester comprises polyethylene terephthalate having a melt point higher than 225° C.

8. The film according to claim 1 wherein the at least one internal gas barrier layer (c) comprises polyvinylidene chloride in an amount of at least 70%.

9. The film according to claim 1 wherein the heat-sealable layer comprises at least one member selected from the group consisting of ethylene-vinyl acetate copolymer, homogeneous linear ethylene-alpha-olefin copolymer, heterogeneous linear ethylene-alpha-olefin copolymer, propylene copolymer, ethylene-propylene copolymer, and ionomer resin.

10. The film according to claim 1 further comprising at least one internal abuse resistant layer (d).

11. The film according to claim 10 comprising at least two internal abuse resistant layers (d') and (d").

12. The film according to claim 11 wherein the layers (d') and (d") are respectively positioned between the outer heat-sealable layer (a) and the internal gas-barrier layer (c), and between the internal gas-barrier layer (c) and the outer layer (b).

13. The film according to claim 10 wherein the at least one internal abuse resistant layer (d) or the at least two internal abuse resistant layers (d') and (d"), comprise at least one member selected from the group consisting of polyamide, polyester, and styrene-based polymer.

14. The film according to claim 10 wherein the at least one internal abuse layer (d) or the at least two internal abuse resistant layers (d') and (d"), comprise polyamide in amount of at least 70%.

15. The film according to claim 10 wherein the at least one internal abuse layer (d) or the at least two internal abuse resistant layers (d') and (d"), comprise a blend of aliphatic and aromatic polyamides.

16. The film according to claim 15 wherein, in said blend, the content of the aliphatic polyamide is between 70% and 97%, and the content of the aromatic polyamide is between 3% and 30%.

17. The film according to claim 10 wherein the total amount of polyamide in the whole film is between 10% and 55%.

18. The film according to claim 10 wherein the sum of the percentage by weight of the polyamide and polyester in the whole film, is between 30% and 80%.

19. The film according to claim 1 further comprising one or more additional layer (e) comprising at least one member selected from the group consisting of acrylate-based resin, ethylene-vinyl acetate and polyolefin.

20. The film according to claim 1 further comprising one or more additional tie layer (f), said tie layer(s) comprising at least one member selected from the group consisting of (i) styrene-based polymer and (ii) polymer blend comprising from 50% to 85% by weight modified ethylene-alpha-olefin copolymer, and from 50% to 15% by weight of a modified ethylene and vinyl acetate copolymer having a percentage by weight of vinyl acetate between 6% and 15%.

21. The film according to claim 1 comprising
at least two internal abuse resistant layers (d') and (d"),
at least one internal additional layer (e), and
at least one internal additional tie layer (f).

22. The film according to claim 1 further comprising at least one member selected from the group consisting of abuse resistant layer (d), and additional tie layers (e) and (f), are interposed between the at least one internal gas-barrier layer (c) and layer (b), the total thickness of said interposed layer(s) being at least 20% of the total thickness of the film.

23. The film according to claim 1 characterized by
A) a total free shrink at 85° C. of at least 55%,
B) a maximum shrink tension in each of the longitudinal and transverse directions of at least of 25 kg/cm$^2$, and
C) a residual shrink tension at 5° C. in each one of the longitudinal and transverse directions at least of 27 Kg/cm$^2$.

24. The film according to claim 1 characterized by a haze value lower than 20%, measured according to ASTM D1003, and/or a gloss value higher than 110 g.u., measured according to ASTM D2457.

25. An article for packaging in the form of a seamless tube, wherein the heat-sealing layer (a) is the innermost layer of the tube, or in the form of a flexible container, comprising a film according to claim 1.

26. A package comprising an article according to claim 25 and a product packaged in said article.

27. A process for manufacturing a film according to claim 1, comprising:
co-extruding, through a round die, a tubular substrate comprising sealant layer (a) on the inside of the tube and at least barrier layer (c) comprising PVDC;
quenching such tubular substrate a temperature of from 5-15° C., after extrusion;
extrusion-coating the substrate with a coating comprising layer (b) comprising an aromatic polyester, thus obtaining an un-oriented tubular film;
quenching such un-oriented tubular film at a temperature of from 5° C. to 30° C.;
heating the tubular film to a temperature above the Tg of all the polymeric resins composing the layers and below the melting temperature of at least one of the resins employed;
biaxially orienting the tubular film at an orientation ratio of from about 2 to about 6 in each of the longitudinal and transverse directions, and
quenching the oriented tubular film at a temperature from 4° C. to 30° C.

28. The process of claim 27 wherein:
the substrate further comprises an abuse resistant, layer (d'), and/or
the coating further comprises an abuse resistant layer (d").

29. The process of claim 27 in which one or more further layers, selected among abuse resistant d), additional e) and tie f) layers, are present in the substrate and/or in the coating, thus providing a film comprising a stack of such layers interposed between the gas-barrier layer (c) and the layer (b) comprising the aromatic polyester, the total thickness of said one or more interposed layers being at least 10% of the total thickness of the film.

30. The process of claim 27, wherein:
coextrusion of the substrate is performed at a temperature not higher than 250° C. and/or
coating of the substrate is performed at a temperature of up to 280° C., and/or
heating of the tube or of the tape is carried out at from 70 to 98° C., and/or
the biaxial orientation is carried out at a ratio of between about 2 and about 6 in each direction; and/or
cooling of the film is effected at a temperature between 4 and 30° C.

31. A packaged product comprising a film according to claim 1 for packaging fresh or processed meat.

* * * * *